United States Patent
Weidmann et al.

(10) Patent No.: US 10,267,903 B2
(45) Date of Patent: Apr. 23, 2019

(54) METHOD AND APPARATUS FOR REDUCING SPECKLE NOISE IN AN OPTICAL SYSTEM

(71) Applicant: ITI Scotland—Scottish Enterprise, Glasgow (GB)

(72) Inventors: Damien Weidmann, Reading (GB); Neil Angus Macleod, Oxford (GB)

(73) Assignee: ITI SCOTLAND—SCOTTISH ENTERPRISE, Glasgow (GB)

( * ) Notice: Subject to any disclaimer, the term of this patent is extended or adjusted under 35 U.S.C. 154(b) by 542 days.

(21) Appl. No.: 14/726,371

(22) Filed: May 29, 2015

(65) Prior Publication Data
US 2015/0260832 A1  Sep. 17, 2015

Related U.S. Application Data

(63) Continuation of application No. PCT/GB2013/053161, filed on Nov. 29, 2013.

(30) Foreign Application Priority Data

Nov. 30, 2012 (GB) .................................. 1221677.6

(51) Int. Cl.
*G01S 7/48* (2006.01)
*G01S 7/491* (2006.01)
(Continued)

(52) U.S. Cl.
CPC ............ *G01S 7/4917* (2013.01); *G01S 7/481* (2013.01); *G01S 7/4911* (2013.01); *G01S 17/02* (2013.01); *G02B 27/48* (2013.01); *G01S 17/325* (2013.01)

(58) Field of Classification Search
CPC .......... G01S 7/40; G01S 7/4915; G02B 27/48
See application file for complete search history.

(56) References Cited

U.S. PATENT DOCUMENTS 7,838,816 B2 * 11/2010 Babayoff ........... G02B 21/0056
250/201.4
8,224,133 B2 * 7/2012 Popovich ............... G02B 27/48
359/15
(Continued)

FOREIGN PATENT DOCUMENTS

JP  2001066247 A  3/2001
JP  3107034 U  11/2004
(Continued)

OTHER PUBLICATIONS

Office Action dated Oct. 3, 2017 for Japanese Application No. 2015-544537 of Weidmann, D. et al., filed Nov. 29, 2013.

*Primary Examiner* — Tri T Ton
*Assistant Examiner* — Rebecca C Bryant
(74) *Attorney, Agent, or Firm* — Perkins Coie LLP

(57) ABSTRACT

The invention relates to a method and apparatus for reducing speckle noise in a system comprising a sensor for detecting electro-magnetic radiation backscattered from a target, comprising: illuminating the target with a first illuminating beam having a first optical path; illuminating the target with a second illuminating beam having a second optical path different to the first optical path; capturing at the sensor first and second backscattered radiation components associated with respectively the first and second illuminating beams, each of the backscattered radiation components comprising a speckle pattern; and taking a time-averaged measurement of the intensities of the first and second backscattered radiation components; wherein the capturing step is carried out within an integration time τ of the sensor, such that the time-averaged intensity measurement results in a decrease in speckle noise present in a signal representing the backscattered radiation.

32 Claims, 14 Drawing Sheets

(51) Int. Cl.
  *G02B 27/48* (2006.01)
  *G01S 7/481* (2006.01)
  *G01S 17/02* (2006.01)
  *G01S 17/32* (2006.01)

(56) References Cited

U.S. PATENT DOCUMENTS

| | | |
|---|---|---|
| 2005/0207160 A1* | 9/2005 | Babayoff ............... G02B 27/48 362/259 |
| 2009/0213350 A1 | 8/2009 | Sogard |
| 2010/0202725 A1 | 8/2010 | Popovich et al. |
| 2011/0031384 A1 | 2/2011 | Babayoff et al. |

FOREIGN PATENT DOCUMENTS

| | | |
|---|---|---|
| JP | 3107388 U | 12/2004 |
| WO | 2013124678 A2 | 8/2013 |

\* cited by examiner

Left, minimum angular displacement of the illuminating beam versus illuminating beam diameter. Right, corresponding overlap function as a function of the angle of displacement.

Three dimensional plot of dithering pattern and corresponding projection onto the αβ-plane for the limiting case of equal frequencies and amplitudes.
Modulation parameters were; Ra=Rb=Rc=10μm, φb=φc=0°

Three dimensional plot of dithering pattern and corresponding projection onto the αβ-plane for the limiting case of equal frequencies and amplitudes. Modulation parameters were; $R_a=R_b=R_c=10\mu m$, and $\varphi_b=\varphi_c=\pm 120°$ Three dimensional plot of dithering pattern obtained by sinusoidal modulation of the piezo actuator module and corresponding projection onto the αβ-plane.
Modulation parameters were; $R_a=R_b=R_c=9\mu m$, $f_b=2f_a$ Three dimensional plot of dithering pattern obtained by sinusoidal modulation of the piezo actuator module and corresponding projection onto the αβ-plane. Modulation parameters were; $R_a=R_b=R_c=9\mu m$, $5f_b=4f_a$

METHOD AND APPARATUS FOR REDUCING SPECKLE NOISE IN AN OPTICAL SYSTEM

This application is a continuation of International Application No. PCT/GB2013/053161, filed Nov. 29, 2013; which claims priority to Great Britain Patent Application No. 1221677.6, filed Nov. 30, 2012. The contents of the above-identified applications are incorporated herein by reference in their entireties.

FIELD OF INVENTION

The present invention relates to a method for reducing speckle noise in an optical measurement system, and in particular to a method for reducing speckle noise in an active optical heterodyne detection system.

BACKGROUND OF INVENTION

Speckle is an observable random intensity pattern produced when a coherent light beam is diffusely reflected from a target, and it is a fundamental source of noise in optical measurement systems. It results from the interference of different reflected portions of an incident beam having random relative optical phases, and is in part dependent on the profile of the reflective surface.

Active optical heterodyne detection systems may be used for stand-off detection of small localised absorption or dispersion signals. It is an object of the present invention to provide an effective method for reducing speckle noise in optical measurement systems and in particular in active optical heterodyne detection systems.

SUMMARY OF INVENTION

A first aspect of the invention relates to a method of reducing speckle noise in a system comprising a sensor for detecting electro-magnetic radiation backscattered from a target. The method comprises illuminating the target with a first illuminating beam having a first optical path; illuminating the target with a second illuminating beam having a second optical path different to the first optical path; capturing at the sensor first and second backscattered radiation components associated with respectively the first and second illuminating beams, each of the backscattered radiation components comprising a speckle pattern; and taking a time-averaged measurement of the intensities of the first and second backscattered radiation components; wherein the capturing step is carried out within an integration time $\tau$ of the sensor, such that the time-averaged intensity measurement results in a decrease in speckle noise present in a signal representing the backscattered radiation.

An advantage of this method is that speckle noise commonly present in measured backscattered electro-magnetic signals may be significantly reduced, improving the quality of the measured signal.

The system may comprise a single coherent electro-magnetic radiation source and the first and second illuminating beams are emitted by the source, and the method may comprise varying the optical path of the first illuminating beam relative to the target to define the second illuminating beam. In practice, it is preferable to use a single coherent radiation source in remote sensing apparatus. The present method may be implemented in such existing apparatus.

The varying step may comprise introducing a phase difference between the first and second illuminating beams, which phase difference is maintained in the backscattered radiation components. In this way, when the time-averaged intensity measurement is taken, the phase difference will result in a decrease in the speckle intensity present as noise in the measured signal, because the intensity profile peaks of the speckle patterns are not coincident Preferably, the phase difference is $n\pi$ where n is any positive odd integer. This ensures that the intensity profiles of the speckle patterns present in the backscattered radiation components are out of phase. The effect of the time-averaged measurement is then akin to the two out of phase speckle patterns destructively interfering, resulting in an improved reduction in speckle noise.

This previously mentioned effect may be achieved by varying the optical path length in a direction substantially parallel to the transmission axis along which the illuminating beams propagate. This introduces an optical path difference between the first and second illuminating beams, which path difference gives rise to the phase difference. Furthermore, the same target area may be illuminated by the first and second illuminating beams.

The target may be illuminated at a first position with the first illuminating beam, and at a second target position with the second illuminating beam, and the varying step comprises displacing the first illuminating beam relative to the target between the first and second target positions.

The first and second target positions are separated by a distance greater than the speckle coherence length $L_c$, such that the speckle patterns produced at respectively the first and second target positions are decorrelated. Advantageously, when the intensities of the decorrelated speckle patterns are time-averaged, the intensity of the resulting speckle noise present in the measured backscattered signal is decreased.

In certain embodiments in the varying step the illuminating beam is displaced by an angle of rotation $\theta$ relative to the target in order to illuminate the second target position. In this way the first illuminating beam may be displaced relative to the target between the first and second target positions.

The angle of rotation $\theta$ may be defined by the inequality:

$$\theta > \frac{L_c}{R} \cong \frac{\lambda}{d}$$

where $L_c$ is the speckle coherence length; R is the linear distance of the target from the illumination source; $\lambda$ is the wavelength of the illuminating beam; and d is the diameter of the illuminating beam at the target. In this way the required angle of rotation may be expressed with respect to known variables, facilitating implementation of the present method.

In certain embodiments the illuminating beam may be displaced relative to the target from the first target position to the second target position with a velocity s defined by the inequality:

$$s > \frac{L_c}{\tau}$$

where $L_c$ is the speckle coherence length, and $\tau$ is the sensor integration time. This ensures that the backscattered radiation is captured by the sensor within the sensor integration time. It is important to note that this velocity is a relative quantity. In other words, the target may be displaced at this velocity with respect to the illuminating beam; or the illuminating beam displaced with this velocity relative to the target. In either case, time-averaging of the backscattered radiation will result in decreased speckle noise present in the measured backscattered signal.

Similarly, the illuminating beam may be displaced relative to the target from illuminating the first target position to illuminating the second target position with an angular velocity ω defined by the inequality:

$$\omega > \frac{\theta}{\tau}$$

where θ is the angle of rotation, and τ is the sensor integration time. Accordingly, the target may be rotated with this angular velocity relative to the illuminating beam; or the illuminating beam rotated with this angular velocity relative to the target.

Intervening target positions may be illuminated when displacing the illuminating beam relative to the target from illuminating the first target position to illuminating the second target position. Accordingly, the present method may be carried out using a continuous illuminating beam.

In certain embodiments the illuminating beam may illuminate a selection of target positions in a repeating pattern having a repetition period larger than the sensor integration time τ, to ensure that different target positions are illuminated within the sensor integration time τ. Alternatively, the illuminating beam may illuminate a random selection of intervening target positions within the sensor integration time τ. Both embodiments ensure that different target positions are illuminated during the sensor integration time τ maximising the generation of decorrelated speckle patterns within the sensor integration time τ.

The illuminating beam may illuminate a selection of target positions lying in a substantially circular pattern within the sensor integration time τ.

A second aspect of the invention relates to apparatus for sensing electro-magnetic radiation backscattered from a target. The apparatus comprises: an illumination source arranged to produce a first illuminating beam having a first optical path and a second illuminating beam having a second optical path different to the first optical path; a sensor arranged to capture, in use, within a sensor integration time τ, a first backscattered radiation component backscattered from the target when illuminated with the first illuminating beam and a second backscattered radiation component backscattered from the target when illuminated with the second illuminating beam, and to take a time-averaged measurement of the intensity of the captured first and second backscattered radiation components, each of which comprises a speckle pattern, such that the time-averaged measurement results in a decrease in speckle noise present in a signal representing the backscattered radiation. Such an apparatus, advantageously, is able to implement the previously summarised method, and to reduce the speckle noise present in the measured backscattered signal.

The apparatus may comprise a beam dithering system arranged to define the first and second illuminating beams.

Preferably, the beam dithering system varies the optical path of an illuminating beam to define the first and second illuminating beams. In this way the optical path of the first illuminating beam may be varied to define the optical path of the second illuminating beam.

The beam dithering system may be arranged to displace the first illuminating beam relative to the target in order to introduce a phase difference between the first and second illuminating beams, which phase difference is maintained in the backscattered radiation components. In this way, the dithering system is able to implement embodiments of the previously described method, and benefits from the same advantages.

Preferably, the beam dithering system is arranged to displace the first illuminating beam relative to the target in order to introduce a phase difference of nπ, where n is any positive odd integer, between the first and second illuminating beams. In this way, the effect of the time-averaged measurement is akin to the two out of phase speckle patterns destructively interfering, resulting in an improved reduction in speckle noise, as described previously.

To introduce a relative phase difference between the first and second illuminating beams, the beam dithering system may be arranged to displace the first illuminating beam in a direction substantially parallel to a transmission axis along which the illuminating beam propagates. For example, this may be achieved by shortening the optical path of the illuminating beam with respect to the target.

In certain embodiments, the first illuminating beam is directed to illuminate a first target position, the second illuminating beam is directed to illuminate a second target position, and the beam dithering system is arranged to displace the first illuminating beam relative to the target by a distance greater than a speckle coherence length $L_c$ to define the second optical path of the second illuminating beam, such that the first and second backscattered electromagnetic radiation components comprise decorrelated speckle patterns. Time-averaging of the decorrelated speckle patterns results in a decrease in the speckle noise present in the measured backscattered signal.

The beam dithering system may be arranged to carry out all the features of the previously summarised method, and the previously summarised benefits associated with those features are also applicable to the beam dithering system.

A third aspect of the present invention relates to a method of generating decorrelated speckle patterns in an optical system for detecting electro-magnetic radiation backscattered from a target, the optical system comprising a sensor. The method comprises: illuminating the target with a first illuminating beam having a first optical path; illuminating the target with a second illuminating beam having a second optical path; capturing first and second backscattered radiation components associated with respectively the first and second illuminating beams at the sensor, each one of the backscattered radiation components comprising a speckle pattern; and wherein the capturing is carried out within the integration time τ of the sensor, and the difference in optical path between the first and second illuminating beams is such that the speckle patterns comprised in the backscattered radiation components are decorrelated. Preferably, the target is illuminated at a first position with the first illuminating beam and at a second target position with the second illuminating beam, and the first and second target positions are separated by a distance greater than the speckle coherence length $L_C$. In this way, when a time-averaged measurement of the backscattered radiation components is performed, the speckle noise present in the resulting measured backscattered signal is decreased.

A fourth aspect of the present invention relates to a beam dithering apparatus for use in a measurement device for detecting electro-magnetic radiation backscattered from a target, the measurement device comprising a sensor and an illumination source. The dithering apparatus is arranged in use to generate decorrelated speckle patterns in the backscattered radiation, and comprises: optical path varying means for varying the optical path of an illuminating beam emitted by the illumination source relative to the target, the optical path varying means being arranged in use to vary the optical path of a first illuminating beam having a first optical, to define a second optical path associated with a second illuminating beam, within the sensor integration time τ; and wherein the optical path varying means is arranged to vary the optical path such that a second backscattered component of electro-magnetic radiation backscattered from the target illuminated with the second illuminating beam, comprises a speckle pattern which is decorrelated with the speckle pattern present in a first backscattered component of electro-magnetic radiation backscattered from the target illuminated with the first illuminating beam.

Preferably, the first illuminating beam illuminates a first target position, the second illuminating beam illuminates a second target position, and the optical path varying means is arranged to displace the first illuminating beam relative to the target by a distance greater than the speckle coherence length $L_C$ to define the second optical path.

BRIEF DESCRIPTION OF DRAWINGS

Specific embodiments of the invention will be described, by way of example, with reference to the accompanying drawings, of which.

DETAILED DESCRIPTION OF SPECIFIC EMBODIMENTS

Figure 1A:
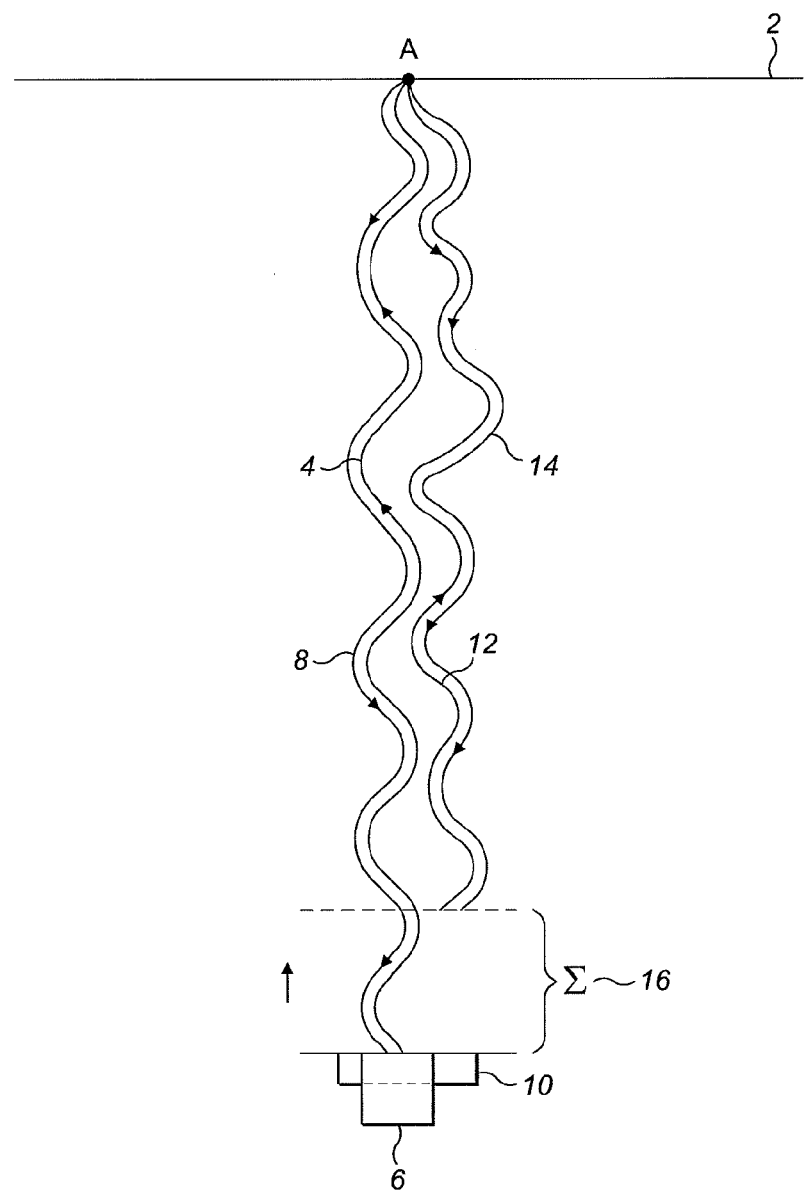
FIG. 1a is a schematic diagram that shows the principle of operation for reducing speckle noise in an embodiment of the invention.

The present invention aims to reduce the intensity of speckle patterns, when incident electro-magnetic radiation is backscattered from a target surface, and subsequently measured in an electro-magnetic radiation measurement device. The invention may be employed in a variety of different types of electro-magnetic radiation measurement devices, including in optical measurement devices, comprising remote sensing devices, such as active optical heterodyne detection systems.

Conventionally, in remote sensing devices, a coherent beam of optical radiation, such as a Gaussian beam emitted by a laser, is used to illuminate a desired target, and the reflected signal is measured. Different physical characteristics of the target may be determined from the reflected signal, depending on the configuration of the optical measurement device. For example, the chemical composition of the target may be determined from an analysis of the reflectance spectrum. Similarly, the target's distance from the optical source and the profile of the reflecting surface are all non-limiting examples of the type of physical characteristics that may be determined from an analysis of the reflected signal.

LIDAR (Light Detection And Ranging) is one example of a known optical remote sensing technology, wherein a coherent light source is used to determine a target's distance. The skilled reader will be familiar with the variety of known optical remote sensing devices, a therefore a more thorough discussion is not necessary for present purposes. It suffices for the reader to appreciate that the invention may be employed in any optical remote sensing device, and is particularly suited for use in active optical heterodyne detection systems, where speckle noise reduction is critical to system performance.

A discussion of the main principles of the invention is set out below. This is followed by a discussion of active optical heterodyne systems configured to carry out the present method, in accordance with the invention.

In general terms, the invention involves illuminating a target with two illuminating beams having different optical paths, and capturing, at a sensor, radiation backscattered from the target illuminated with the two illuminating beams, within the integration time τ of the sensor. A time-averaged intensity measurement of the backscattered radiation is performed, which results in a decrease in the speckle noise present in a measured signal representing the backscattered radiation. In the present context the optical path of an electro-magnetic beam is the path which the electro-magnetic beam traverses between the target and the source, and/or the path between the target and sensor.

The action of varying the optical path of an illuminating beam is referred to as beam dithering. In this respect the path may be varied by changing the path distance relative to the target, for example by shortening the path; or by changing the relative orientation of the optical path with respect to the target.

The invention to be described below, contemplates two dithering variants. The first variant, which is discussed in further detail below with reference to FIG. 1a, is referred to as translational dithering. The second variant, to be described below with reference to FIG. 1a, is referred to as angular dithering.

FIG. 1a shows surface area A of a target 2 illuminated with a first illuminating beam 4 emitted by an illumination source 6. The first illuminating beam has a first optical path. The backscattered radiation 8, which comprises a first speckle pattern, is captured by an optical sensor 10 having an integration time τ. In FIG. 1a, the optical sensor 10 and the illumination source 6 are shown as being superimposed, however this is not a hard requirement. The optical path of the illuminating beam 4 is subsequently varied relative to the target 2, and the target is illuminated with a second illuminating beam 12 having a second optical path shorter than the first optical path. In other words, an optical path difference Σ 16 is present between the first and second illuminating beams 4, 12.

The backscattered radiation 14, which comprises a second speckle pattern, is subsequently measured with the optical sensor 10. The optical path difference Σ 16 between the first and second illuminating beams 4, 12 is selected such that the speckle intensity patterns present in radiation backscattered from the target illuminated with respectively the first and second beams, comprise a relative phase difference. Provided that the backscattered radiation 8, 14 is received by the optical sensor 10 within the sensor's integration time τ, then the measured intensities of the out-of-phase speckle patterns will be time-averaged by the sensor, resulting in a net decrease in the speckle noise present in the measured backscattered radiation signal. The relative phase difference present in speckle patterns has the same effect as if the speckle patterns were interfering deconstructively.

It is to be noted in the present context that the term optical path difference relates to the difference in path between any two or more electro-magnetic beams, and is not restricted to beams in the visible spectrum. Accordingly, the present invention may be used in accordance with any electro-magnetic radiation, including microwaves, and infra-red radiation.

Referring to FIG. 1a, the optical path difference Σ 16 is selected to give rise to an optical phase difference between the two illuminating beams 4, 12 by varying the length of the optical path of the second illuminating beam 12. Preferably, the optical phase difference is such that the two illuminating beams 4, 12 are perfectly out of phase. For example, for a sinusoidal wave form, the phase difference is preferably an odd integer multiple of π, such that the phase difference ϕ is given by:

$$\emptyset = n\pi \forall n = 1, 3, 5,$$ eq. 1.0

Backscattered speckle patterns that are perfectly out of phase will effectively interfere deconstructively when time-averaged at the optical sensor. It is important to note that this is not a hard requirement of the present method. Alternative phase differences may be used, provided that the relative phase difference is selected such that the waves of the two illuminating beams do not interfere constructively to increase the speckle noise when time averaged at the optical sensor. Constructive and destructive interference have their usual meanings in the present context.

In practice, the first and second illuminating beams 4, 12 may be emitted by the same optical source. In such embodiments, one way of implementing the above discussed variant is to introduce a waveplate (also commonly referred to as a retarder) or functional equivalent in the optical path of the beam, in order to introduce the desired phase shift. For example, a half-wave plate may be used to introduce a relative phase shift of π. Further details of how this dithering variant may be implemented in practice are discussed following the below discussion of the second dithering variant.

The second dithering variant involves varying the optical path of the illuminating beam in order to illuminate different target surface areas. Decorrelated speckle patterns are backscattered from the illuminated surface areas, and can be time-averaged by an optical sensor.

Figure 1B:
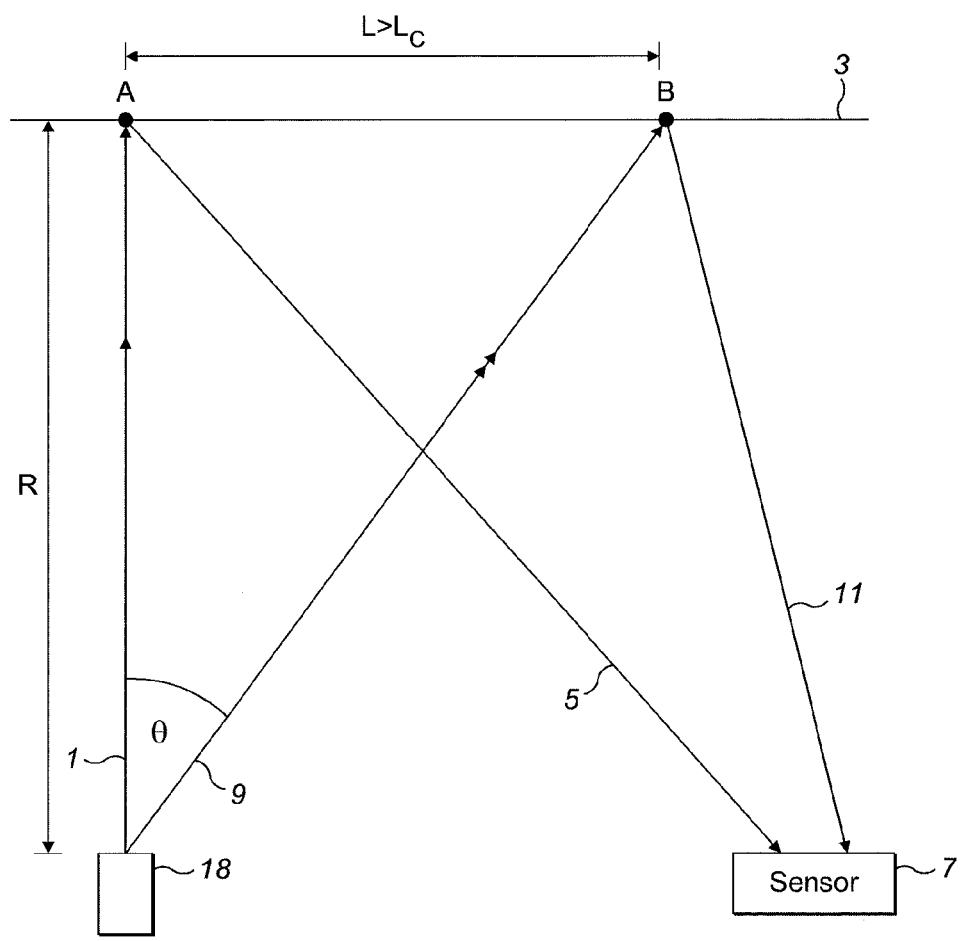
FIG. 1b is a schematic diagram that shows the principle of operation for reducing speckle noise in a different embodiment of the invention.

FIG. 1b illustrates the basic principle of operation of the second dithering variant that generates decorrelated speckle patterns. A first beam of coherent light 1 is emitted from an optical illumination source 18 and is incident on a target 3 at a distance R from the illumination source.

The first beam 1 illuminates a first target area A. Whilst in FIG. 1b the beam of light 1 is schematically represented by a ray, it is to be appreciated that the beam 1 has a defined spot size and cross-sectional area, and when incident on a target, illuminates a target area equal in size to the beam spot size at that point in space. A portion of the incident beam is reflected by the target to form a first reflected signal 5 that is subsequently measured by a sensor 7 having an integration time τ. The integration time defines the time lapse between consecutive sensor readings, and accordingly the sampling rate of the sensor is the inverse of the integration time (i.e. 1/τ). A single data point is sampled by the sensor 7 during each integration time τ, also referred to as a sensor integration cycle.

A second target area B, separated from the first target area A by a distance L greater in magnitude than the speckle coherence length $L_c$ (i.e. $L > L_c$) is illuminated by a second beam 9, displaced with respect to the first beam 1 by a small angle of rotation θ (note that FIG. 1 is not to scale, and the magnitude of θ is exaggerated for illustrative purposes). As with the first illuminating beam 1, a portion of the second illuminating beam 9 is reflected by the target 3, to form a second reflected signal 11 that is measured at the sensor 7.

Both of the first and second reflected signals 5, 11 comprise speckle noise. In this instance, the speckle noise is characterised by the profile of the reflecting surface—namely, by surface areas A and B respectively. Provided that both reflected signals 5, 11 are received by the sensor 7 within the integration time τ, the sensor 7 effectively measures the average of the intensities of the two received speckle patterns over the integration time τ. Since both speckle patterns are decorrelated because $L > L_c$, this averaging results in a net damping of the speckle intensity sampled by the sensor 7 during a single integration cycle. Thus by time-averaging the measured speckle pattern resulting from two different illuminated target areas separated by a distance greater than the speckle coherence length within the integration time of the sensor, the magnitude of the measured speckle noise is reduced.

In practice, a single coherent illumination source may be used to emit the first and second illuminating beams. This may be achieved using a beamsplitter to separate an illuminating beam into two separate illuminating beams which are subsequently emitted and illuminate two different target areas A and B. Optical apparatus may be used to direct each illuminating beam to the required target area. Effectively, with respect to the target, the two illuminating beams appear to originate from two different sources.

Alternatively, and with reference to FIG. 1b, a single coherent illumination source may be used to emit the first and second illuminating beams 1, 9, such that both beams appear to originate from the same source with respect to the target. In such embodiments, it is necessary to displace the second illuminating beam 9 through an angle θ with respect to the first illuminating beam 1, in order to illuminate different target areas A and B within the integration time τ and for this reason the second variant is referred to as angular dithering. The linear speed s of the beam motion with respect to the target 3 is preferably greater than the ratio of the speckle coherence length $L_c$ over the sensor integration time τ:

$$s > \frac{L_c}{\tau} \quad \text{eq. 1.1}$$

As in practice the distance R of the coherent light source from the target is significantly larger than the speckle coherence length $L_c$, the small angle approximation (i.e. tan θ≈θ) holds for the angle of rotation θ, and consequently the magnitude of the required angle of rotation may be expressed as:

$$\theta > \frac{L_c}{R} \cong \frac{\lambda}{d} \quad \text{eq. 1.2}$$

where λ is the wavelength of the illuminating beam, and d is the diameter of the illuminating beam on the target (also commonly referred to as the beam spot size). Equation 1.2 is convenient because it expresses the required angle of rotation in terms of easily definable variables.

For a Gaussian beam, such as emitted by a laser, the diameter of the illuminating beam is given by:

$$d = 2w_R = 2w_0 \left(1 + \left(\frac{R}{z_R}\right)^2\right)^{1/2}, Z_R = \frac{\pi w_0^2}{\lambda} \quad \text{eq. 1.3}$$

where $w_R$ is the beam radius at the target, $w_0$ is the beam waist of the illuminating beam and $Z_R$ is the Rayleigh length, which is a function of the beam waist and the beam wavelength.

From equations 1.2 and 1.3 it is possible to calculate the minimum angular variation of the illuminating beam 1 required within the integration time τ of the sensor 7, in order to produce decorrelated speckle patterns at the sensor 7.

Figure 2A:
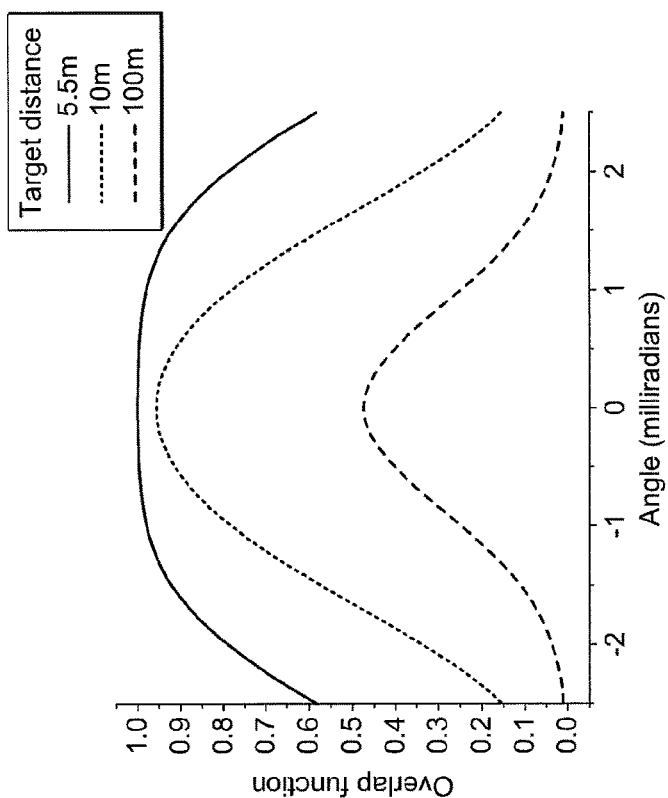
FIG. 2a is a graph that shows the relationship between the minimum angular displacement of the illuminating beam required as a function of the beam diameter, in the embodiment of FIG. 1.

FIG. 2a illustrates the minimum required angular displacement of the illuminating beam as a function of beam diameter d, calculated for different target distances R, using equations 1.2 and 1.3. The calculations were carried out for a target located at 5.5 m 13, 10 m 15, and 100 m 17 from the coherent light source, and for a transmitted beam spot having a diameter ranging from 0 mm to 30 mm. To reiterate, it is to be appreciated that the transmitted beam spot relates to the beam spot size at the target. The calculated results indicate that larger target distances require smaller angular displacements.

The results calculated for a target distance of 5.5 m clearly indicate an upper limit of 0.55 mrad to the minimum required angular displacement. Accordingly, displacing the first illuminating beam 1 with an angular velocity of 0.55 mrad per integration time τ is sufficient to obtain decorrelated speckle patterns at the sensor 7 for a target located at least 5.5 m from the illumination source. However, displacement of the illuminating beam may reduce the amount of reflected light captured by the sensor. In other words, the efficiency of collection of the backscattered radiation may be reduced through degradation in the overlap between the illuminating beam and the receiving field of view (i.e. the field of view of the sensor).

Figure 2B:
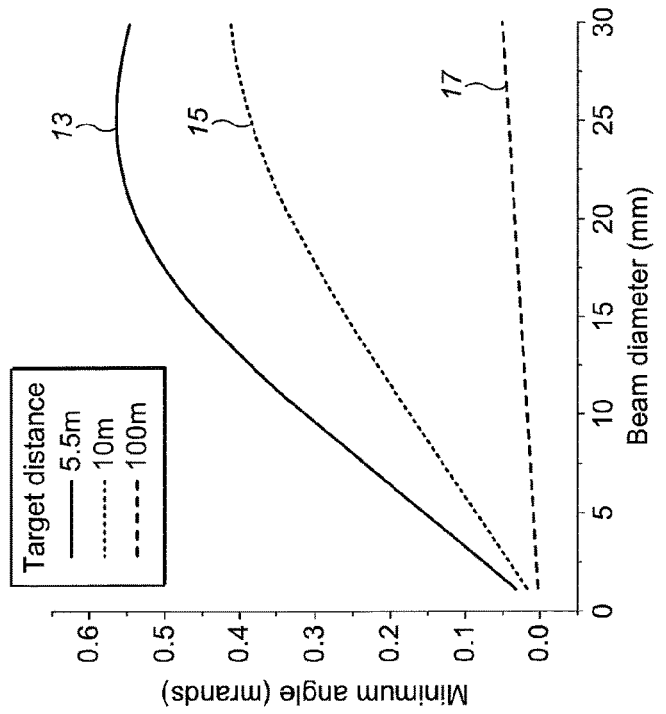
FIG. 2b is a graph that shows the relationship between the overlap function as a function of the angle of displacement, in an optical heterodyne detection system incorporating the embodiment of FIG. 1.

FIG. 2b illustrates the overlap function of an active optical heterodyne detection system, such as will be described with reference to FIG. 4. The overlap function is described as a function of the angular displacement, calculated for the same aforementioned three different target distances. The overlap function is a normalised measure of the amount of emitted optical radiation incident on the target that is backscattered within the field of view of the sensor 7.

In the example illustrated in FIG. 2b, the beam diameter of the illuminating beam at the target 3 located at a distance of 5.5 m from the light source was 9 mm, and the diameter of the sensor was 25 mm. FIG. 2b shows that over an angular displacement of +/−1 mrads, and for a target located 5.5 m away from the light source, there is no substantial drop off in the amount of backscattered radiation falling within the field of view of the sensor 7. However, for larger angular beam displacements, a noticeable loss in the amount of reflected radiation falling within the field of view of the sensor 7 is observed. Furthermore, FIG. 2b shows that for larger target distances, a smaller amount of the reflected radiation falls within the field of view of the sensor 7.

In conclusion, the amount of reflected optical radiation falling within the field of view of the sensor 7 is dependent on both angular displacement and target distance, and will impact the magnitude of the measured backscattered signal.

Figure 3:
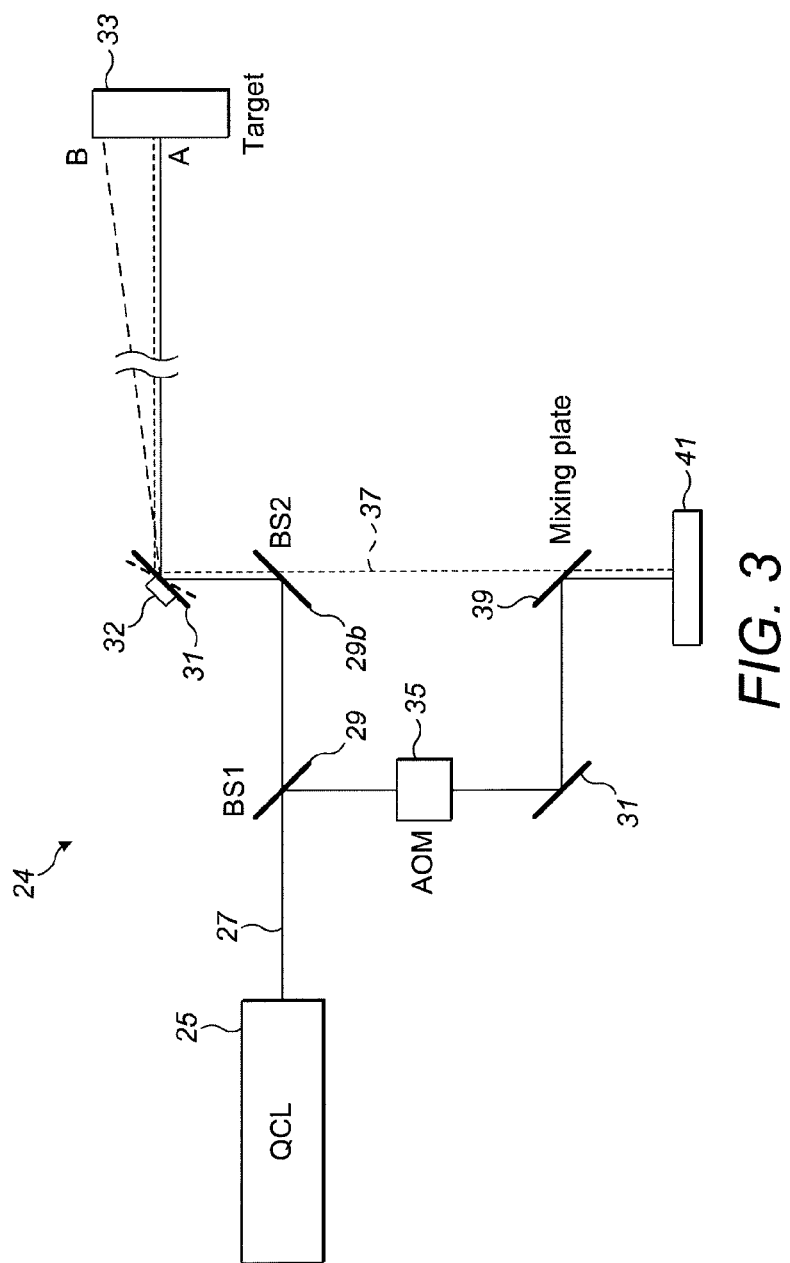
FIG. 3 is a schematic diagram of an active optical heterodyne detection system configured to reduce speckle noise, in accordance with the invention.

FIG. 3 illustrates an example of an active optical heterodyne detection system 24 arranged to employ both dithering variants—namely, arranged to employ transverse and angular dithering.

A laser source 25, which may be a continuously tunable laser source and/or any other laser source including a quantum cascade laser (QCL), emits a coherent radiation beam, such as infra-red radiation. The emitted radiation beam 27 is used for two different purposes. Means are provided to split this radiation into a first and second part—in the present example, the means is provided by a first beam splitter 29. A first part of this radiation is directed to a further beam splitter 29b, and beam displacement apparatus to a remote target 33. A second part of this radiation is not routed to the target at all, but as a local oscillator in the heterodyne detector 41.

The beam displacement apparatus comprises, in this example, a position-variable mirror 31 mounted and/or otherwise operatively connected to an actuator 32. The actuator may be configured to provide one, two, or three degrees of freedom of movement to the mirror 31. For example, when configured with one degree of freedom of movement, rotation of the mirror 31 is constrained to movement about either the horizontal axis (x-axis), and the vertical axis (y-axis), or to movement along the transmission axis (z-axis). In this example, the z-axis is defined as the direction of propagation of the first radiation beam incident on the target at point A.

When configured with two degrees of freedom of movement, the mirror 31 may be rotated about both the horizontal axis (x-axis) and the vertical axis (y-axis). Similarly, when configured with three degrees of freedom of movement, the mirror 31 may be rotated about both the x- and y-axis, and may simultaneously be displaced along the z-axis.

In this way, the position-variable mirror 31 is able to vary the optical path of the illuminating beam as required in accordance with either dithering variant and may also implement both dithering variants in combination. For example, in order to implement the first variant (translational dithering), only displacement along the transmission axis (z-axis) may be required. In contrast, in order to implement the second variant (angular dithering), displacement along one or more of the x-axis and the y-axis may be required, in order to ensure that the emitted beam 27 is displaced by the required angle defined in equation 1.2. When implementing both variants simultaneously, the mirror 31 is rotated around either or both of the x-axis and y-axis, whilst simultaneously being displaced along the z-axis.

The second part of the radiation split at the first beam splitter 29 is routed to a means to shift its frequency. In this embodiment, the frequency-shifting means is provided by an acousto-optical modulator (AOM) 35. This provides the local oscillator required by the active optical heterodyne detection system 24.

Backscattering of the first part of the infra-red radiation takes place at the target 33, and the system comprises apparatus to receive a backscattered component from the target 33. This received component 37 is reflected by the position-variable mirror 31 and passes through the second beam splitter 29b, and passes through to a mixing plate 39.

The mixing plate 39 is a device arranged to mix together the backscattered component received from the target 33 and the frequency-shifted second part of the emitted radiation, to provide a signal for heterodyne detection. This mixed signal is routed to a sensor 41 with appropriate capability for heterodyne detection and subsequent computation and analysis.

As mentioned previously, when configured to carry out the second dithering variant, the position-variable mirror 31 may be provided with one or two degrees of freedom of movement. In order to reduce the speckle noise present in the received backscattered component 37, the position-variable mirror 31 is rotated through the required angular displacement θ (recall equation 1.2) with respect to the target 33, in order to illuminate a second target area B within the integration time τ of the detector 41. In this way, the detector 41 receives decorrelated speckle patterns from at least two different target areas separated by a linear distance greater than the speckle coherence length within the detector integration time τ. Rotation of the position-variable mirror 31 is selectively controlled by operation of the associated actuator, which may itself be operatively controlled by an electronic control system (not shown).

It is to be noted that the angle θ as defined in equation 1.2 is greater than the wavelength of the illuminating beam divided by the diameter of the illuminating beam at the target. In practice θ may be considered a threshold condition, which must be satisfied in order to obtain decorrelated speckle patterns. Accordingly, a threshold angle $\theta_C$ may be defined as $$\theta_c = \frac{L_c}{R} \cong \frac{\lambda}{d} \qquad \text{eq. 1.5}$$

The required angular displacement is then $$\theta > \theta_c \qquad \text{eq. 1.6}$$

In embodiments where the target distance R is known, the threshold angle $\theta_C$ may be calculated directly from equations 1.3 and 1.5. The required angular displacement is then selected such that the inequality of equation 1.6 is satisfied.

In practical applications where the target distance R is unknown, any suitable distance measuring device, such as for example a laser range finder, may be used to obtain a target distance measurement. The required angular displacement θ may then be calculated in the previously described manner.

Alternatively, the required angular displacement may be determined empirically. Where it is known that the target distance R is equal to or greater than a known target distance, then the required angular displacement may be selected using previously determined angular displacement values. For example, where it is known that the target distance is greater than or equal to 5.5 m, the required angular displacement may be set at 0.55 mrad per integration time τ. This approach works well provided that a sufficient amount of the backscattered radiation falls within the field of view of the sensor.

In order to rotate the mirror 31 by the required angle within the sensor integration time τ, it is necessary that the actuator is characterised by having a reaction time less than the sensor integration time τ. In practice, the sensor integration time τ is likely to be on the order of milliseconds. For example, typical sensor integration times τ may vary from 5 ms to 100 ms. Accordingly, to accommodate such short sensor integration times requires a very fast-acting actuator.

In preferred embodiments, a piezoelectric actuator (commonly referred to simply as a 'piezo actuator') is employed, although in principle any type of actuator may be used having a suitable response time and capable of rotating the mirror 31 through the required angle, and/or, as the case may be, capable of displacing the mirror 31 along the transmission axis by the required amount as discussed in further detail below.

When configured to implement the first dithering variant, and as mentioned previously, the mirror 31 may be provided with one degree of freedom of movement along the transmission axis (z-axis). In this embodiment the active optical heterodyne detection system of FIG. 3 operates in substantially the same way as described previously, with the exception that the illuminating beams are not displaced along the illuminated surface of the target 33. Instead, the position of the mirror 31 is varied along the transmission axis in order to introduce an optical path difference, such that a phase difference exists between the two or more emitted illuminating beams, as described previously. With reference to FIG. 1a, in this variant, the same target surface area A is illuminated by the two emitted illuminating beams. However, the optical phase difference present between the at least two emitted illuminating beams is maintained in the subsequently backscattered speckle patterns. The position of the mirror 31 is varied along the z-axis at a rate sufficient to ensure that the backscattered speckle patterns are received within the sensor integration time τ, as described in relation to previous embodiments.

It is to be appreciated that whilst the present method has been described in terms of two or more discrete illuminating beams being used to illuminate a target, and specifically illuminating the target with a first illuminating beam associated with first optical path, and subsequently illuminating the target with a second beam associated with a different optical path, this action is repeated for every data point sampled by the optical sensor. Furthermore, it is to be appreciated that the two or more discrete illuminating beams may be replaced by a single continuous beam associated with a varying optical path.

When implementing the second dithering variant the action of dithering the illuminating beam between the first target surface area A and the second target surface area B is a continuous action repeated for every sampled data point, and is akin to repeatedly scanning the illuminating beam across the target surface area between surface areas A and B. The illuminating beam scanning frequency $f_s$ (also referred to as the dithering frequency) must be equal to or greater than the inverse of the sensor integration time $\tau$.

$$f_s \geq \frac{1}{\tau} \qquad \text{eq. 1.7}$$

Equation 1.7 is also valid for the first dithering variant, wherein the illuminating beam is dithered along the transmission axis. In this embodiment, the dithering frequency relates to the frequency with which the position of the mirror 31 is displaced along the transmission axis. This displacement may be a periodic oscillation, with an oscillation frequency given by equation 1.7.

Figure 4:
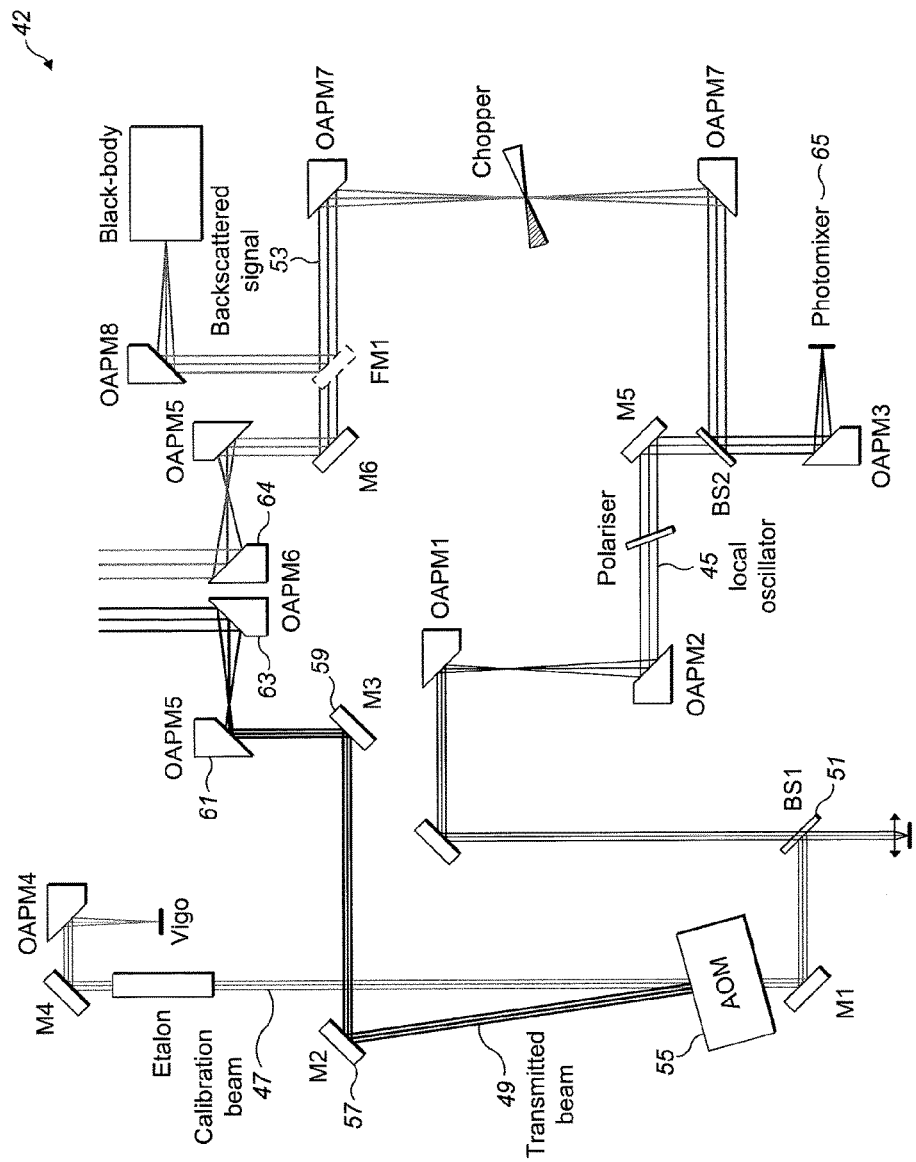
FIG. 4 is a schematic diagram showing an alternative active optical heterodyne detection system configured to reduce speckle noise, in accordance with the invention.

FIG. 4 illustrates an alternative active optical heterodyne detection system 42 arranged in accordance with the present invention. This system is the subject of the applicant's co-pending UK Patent Application No. 1203042.5, and accordingly for a full discussion of the system the interested reader is referred to that application.

The following labels are used in FIG. 4 to identify optical apparatus: the acronym "M" is used to represent reflecting mirrors; the acronym "OAPM" is used to represent off-axis parabolic mirrors; the acronym "BS" is used to represent beam splitters; the acronym "AOM" is used to represent an acousto-optical modulator.

For present purposes a detailed understanding of the system of FIG. 4 is not required. Instead, it suffices to appreciate that the laser beam emitted from the quantum cascade laser (QCL) 43 is separated into three different beams—a local oscillator beam 45, a calibration beam 47 and a transmitted beam 49. The calibration beam 47 is reflected at the first beam splitter 51, while the local oscillator beam 45 is transmitted through the beam splitter 51 for amplifying the backscattered signal 53. The transmitted beam 49 is separated from the calibration beam 47 in the acousto-optical modulator (AOM) 55 by frequency shifting, while the calibration beam 47 retains its input frequency. The calibration beam 47 and the transmitted beam 49 exit the AOM 55 with an angular separation. When excited by a sound wave the AOM 55 creates a grating through transverse refractive index modulation. Interaction of input radiation with this grating structure results in the production of frequencies which differ from the original input frequency.

In order to implement translational dithering, the transmitted beam 49 is dithered along the transmission axis with a frequency provided by equation 1.7, and by an amount sufficient to introduce an optical phase difference preferably having a magnitude given by equation 1.0, although alternatives are also feasible that are consistent with previously described requirements.

In order to implement angular dithering, the transmitted beam 49 is rotated by an angle of rotation $\theta$ given by equation 1.2 and 1.6. For implementation of either dithering variant, beam dithering apparatus may be integrated with any one of the optics present in the transmitted beam path. For example, the beam dithering apparatus may be integrated with any one of the AOM 55, M2 57, M3 59, OAPM5 61, or OAPM6 63.

Integrating the dithering apparatus with the AOM 55 may comprise operatively coupling the AOM 55 with an actuator (not shown). Whilst an actuator has been omitted from FIG. 4 for clarity, such an actuator may have the characteristics of the actuator described in FIG. 3. Controlled operation of the actuator may rotate the AOM 55 to dither the transmitted beam 49 by the required angle of rotation, and/or, as the case may be, may vary the position of the AOM 55 along the transmission axis in order to dither the transmitted beam 49 by the required amount.

Alternatively, a similar actuator may be coupled to any one of mirrors M2 57, M3 59, OAPM5 61 and OAPM6 63, and operates as described previously in relation to the embodiment illustrated in FIG. 3.

Depending on whether the first, second, or a combination of both variants is required, the actuator may be provided with respectively one, two or three degrees of freedom of movement, providing movement along either one, two or three independent axis. For example, an actuator having two degrees of freedom of movement, capable of displacement in both the horizontal direction (designated as the x-axis for present purposes) and in the vertical direction (designated as the y-axis for present purposes) with respect to the illuminating beam propagation direction (designated as the z-axis for present purposes, arranged perpendicular both the x- and y-axis) may be used for carrying out the angular dithering. Similarly, an actuator capable of movement along the z-axis may be used for carrying out translational dithering. An actuator capable of displacement along the x-, y-, and z-axis may be used to carry out a combination of both variants—i.e. both translational and angular dithering.

In preferred embodiments, the actuator is a piezoelectric actuator. Piezoelectric actuators are one example of a fast acting actuator suitable for use in the present application in order to provide the required dithering frequencies. An example of a commercially available piezoelectric actuator that may be used is the S316.10 piezo actuator manufactured by PI GmbH. This actuator provides a maximum achievable angular displacement of 1.2 mrad, and has a maximum achievable frequency of 500 Hz. The maximum achievable frequency of the piezoelectric actuator is defined as the frequency at which the actuator is modulated by a sinusoidal external voltage over an angular distance of 1 mrad.

The S325.3SL piezo actuator also manufactured by PI GmbH, is another example of a commercially available piezo actuator suitable for use in accordance with the present method. The S325.3SL piezo actuator has a larger maximum achievable frequency of 1 kHz, and a maximum achievable angular displacement of 5 mrad, which is suitable for most practical applications. Both aforementioned actuator models are characterised by having three degrees of freedom of movement, and are therefore capable of carrying out either variant, and/or a combination of both.

Figure 5:
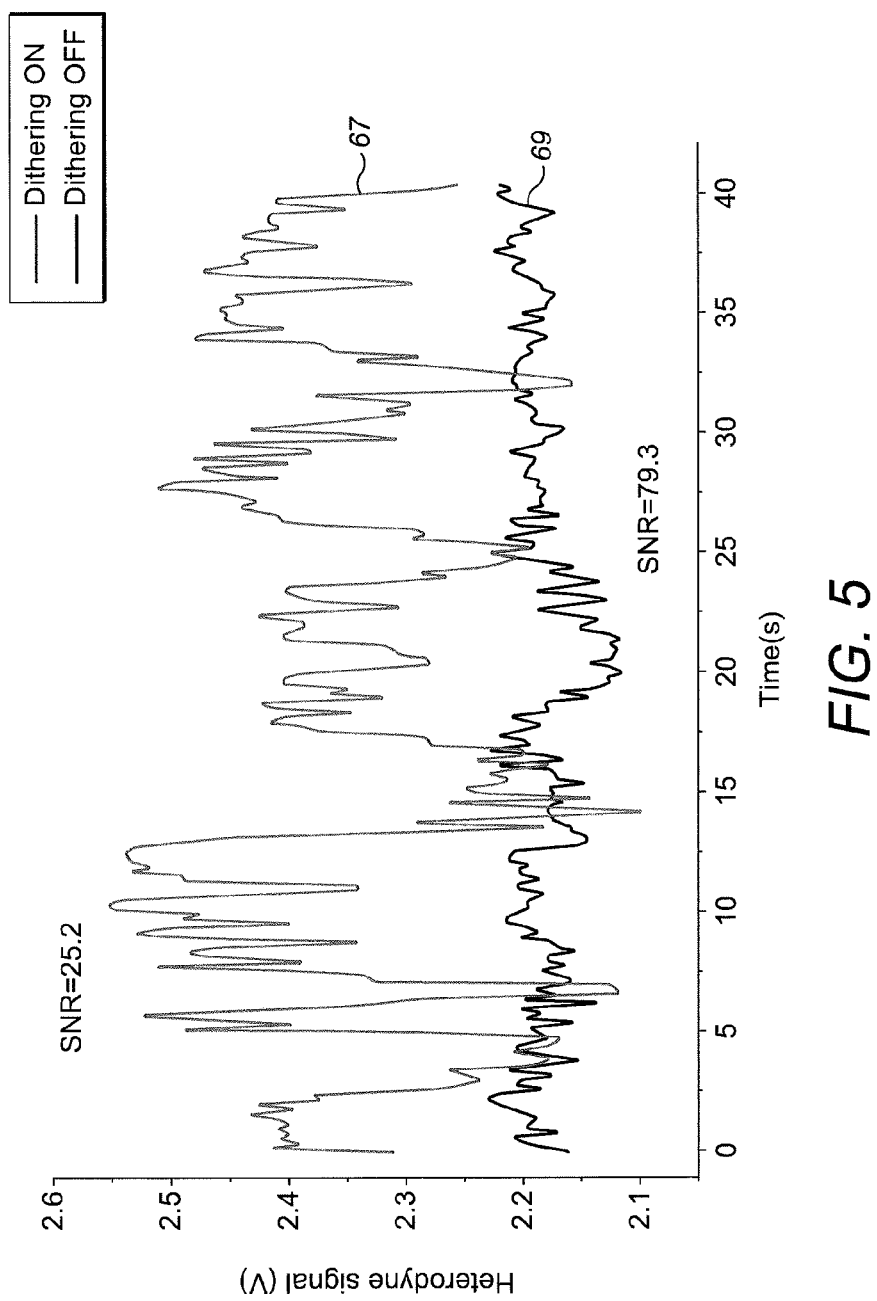
FIG. 5 is a graph that shows experimental results of heterodyne signals measured with the apparatus of FIG. 4, and in particular highlights the efficacy of the invention in reducing speckle noise in the measured heterodyne signal.

FIG. 5 provides experimental results obtained using the system 42 of FIG. 4 to implement angular dithering. A stationary diffuse reflectance (~93%) gold target located at a distance of 5.45 m was illuminated with a laser beam, and the backscattered heterodyne signal measured at the photomixer 65. Measurements of the backscattered signal were carried out for a stationary illuminating beam—in other words, no beam dithering occurring, and only one area of the target illuminated. Subsequently, measurements of the backscattered heterodyne signal were measured with angular dithering occurring.

The first heterodyne signal 67 illustrates the results obtained in the absence of beam dithering, whilst the second heterodyne signal 69 illustrates the results obtained with angular dithering occurring.

The illustrated experimental results were obtained with a piezo actuator positioned at flat mirror M3 59 (see FIG. 4), and the off-axis paraboloid mirror OAPM5 61 was replaced with a flat gold coated mirror. The S325.3SL piezo actuator was in a dual tilt configuration, having two degrees of freedom in both the horizontal and vertical orientations. The piezo was sinusoidaly tuned across a range of 0-2 mrad by application of an external voltage (−5V to +5V) with a maximum frequency response of approximately 300 Hz at this voltage.

Figures 6A, 6B:
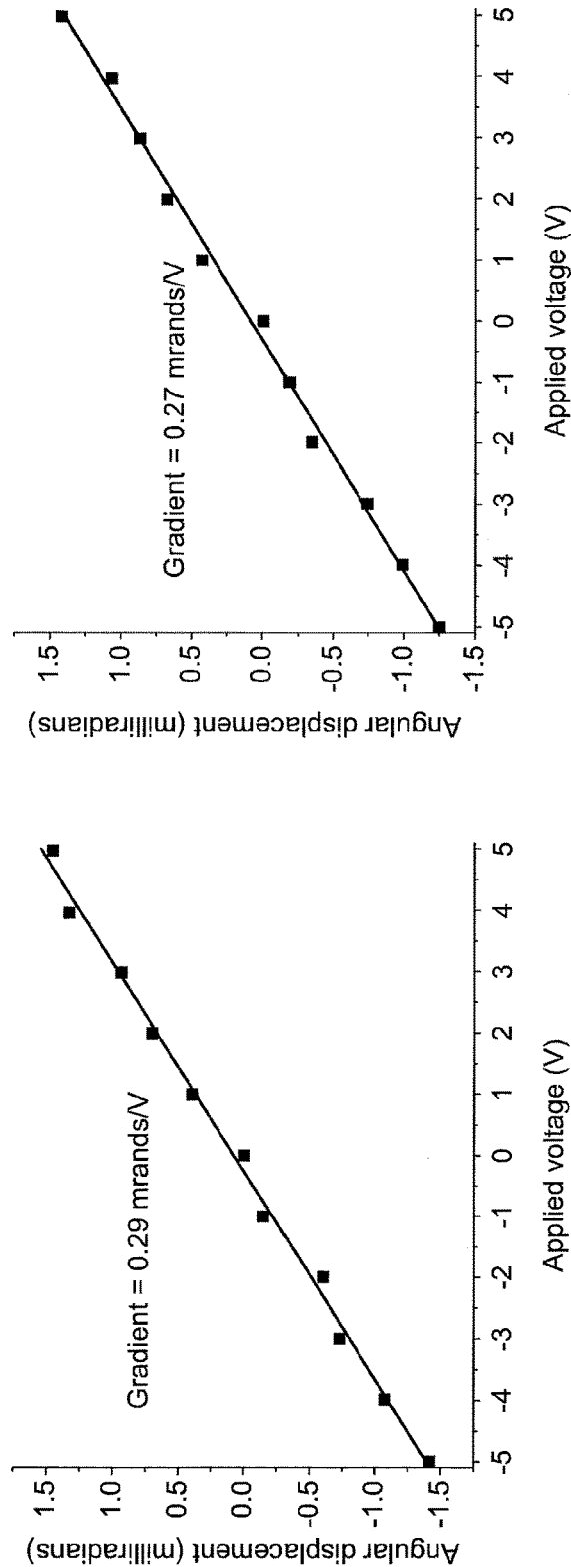
FIGS. 6a and 6b are graphs that show the angular displacement of a transmitted illuminating beam as a function of voltage applied in horizontal and vertical directions to an actuator used in the apparatus of FIG. 4.

FIG. 6a illustrates the angular displacement in the horizontal direction (x-axis) of the transmitted beam as a function of the voltage applied to the piezo actuator. FIG. 6b illustrates the angular displacement in the vertical direction (y-axis) of the transmitted beam as a function of the voltage applied to the piezo actuator. Both sets of results were experimentally obtained using the system 42 of FIG. 4. FIGS. 6a and 6b clearly show that the variation is linear. In the horizontal direction, the responsiveness of the piezo actuator was 0.29 mrads/V, whilst in the vertical direction the responsiveness was 0.27 mrads/V.

Returning to FIG. 5, sinusoidal voltages with a 200 Hz frequency and a 5V peak-to-peak amplitude were applied respectively to the horizontal and vertical channels of the piezo actuator with a 45° phase difference. The laser 43 was operated in fixed frequency mode, and temporal traces of the backscattered heterodyne signal recorded with a 100 ms sensor integration time. The speed of the dithering corresponds to a total angular displacement of 56 mrads, within the sensor integration time.

FIG. 5 clearly shows a net loss in intensity (~5%) of the measured backscattered heterodyne signal, when angular beam dithering is active. This intensity loss is likely due to a portion of the backscattered radiation not being backscattered within the field of view of the sensor (i.e. the photomixer 65).

It is clear to see from the experimental results illustrated in FIG. 5 that the Signal-to-Noise Ratio (SNR) improves significantly when angular dithering is active. The SNR associated with the measured backscattered heterodyne signal obtained using a stationary beam (i.e. no beam dithering occurring) was measured as 25.2, whereas the SNR associated with a measured backscattered heterodyne signal obtained using dithering was 79.3. In this instance angular dithering improved the SNR by a factor of approximately three (~3), confirming the efficacy of dithering. The improved SNR results from a reduction in speckle noise within the backscattered heterodyne signal 69 measured by the sensor (i.e. the photomixer 65).

The effectiveness of the method may be improved by the type of beam dithering pattern selected. This affects the number of uncorrelated speckle patterns averaged during the sensor integration time.

For angular dithering, in order to maximise the generated decorrelated speckle patterns it is necessary that the speckle patterns originate from target surface areas which are separated by a distance $L > L_C$, which may be referred to as decorrelated surface areas. If the selected dithering pattern has a repeating profile, and the frequency of the dithering pattern is less than the sensor integration time, then identical surface areas are revisited during the sensor integration time and maximum decorrelation of the speckle patterns is not achieved. One way of mitigating for this is to select a random non-repeating dithering pattern, to prevent the same target surface location being illuminated during a sensor integration time (also referred to as a sensor integration cycle). Alternatively, a repeating periodic dithering pattern may be used, having a period (i.e. the time taken to complete one dithering pattern cycle) greater than or equal to the sensor integration time. This ensures that different decorrelated surface locations are illuminated during a single sensor integration cycle. Similarly this condition may be expressed in terms of frequencies, in which case the beam dithering frequency is less than or equal to the sensor sampling frequency, since the frequency is inversely proportional to the time period.

Figure 7:
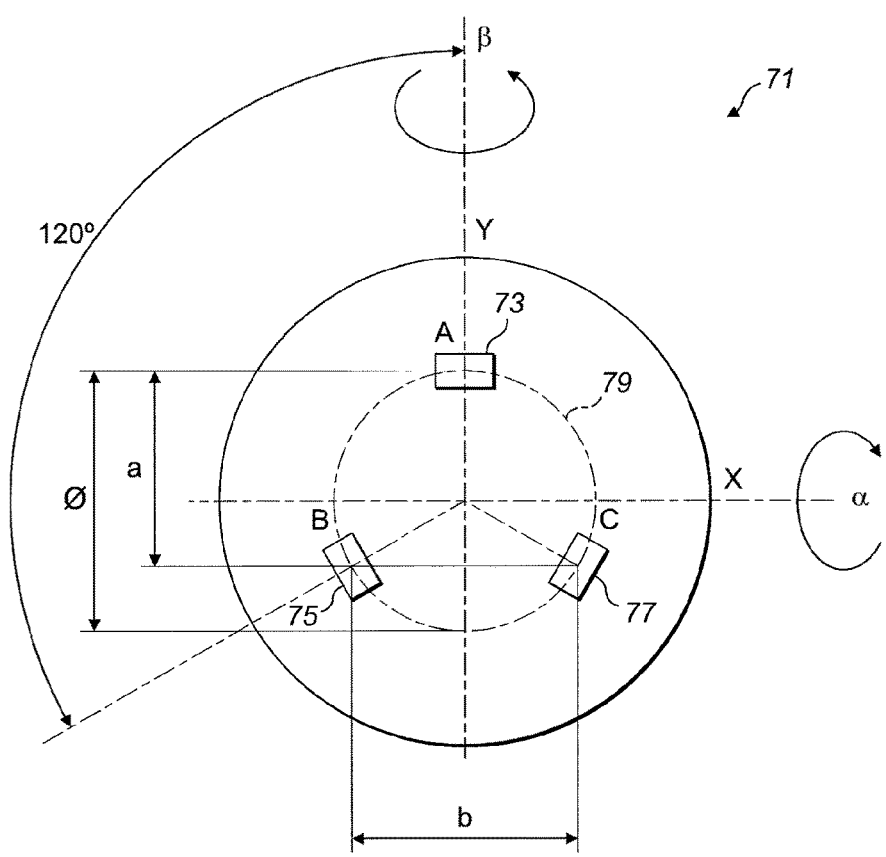
FIG. 7 is a schematic front view of a three-axis piezo-actuator module taken along the transmission axis (z-axis), which can be implemented in the systems of FIG. 3 or 4.

FIG. 7 is a front view of a three-axis piezo-electric actuator module 71, which can be implemented in the systems 24, 42 of FIG. 3 or 4 to carry out any dithering variant. The front view is taken along an axis perpendicular to the plane of the page. The illustrated module can be located as described previously for the actuator in the systems 24, 42 of FIG. 3 or 4. The module 71 comprises three independently operable piezo-actuators A 73, B 75, and C 77 evenly distributed along a circle 79 of diameter 8.7 mm. Each actuator A 73, B 75, C 77 has a maximum travel range of 30 μm and is operable up to a frequency of 500 Hz. In the illustrated example, the y-axis corresponds to the vertical axis; the x-axis corresponds to the horizontal axis; and the z-axis, which leads out of the page and is orthogonal to the x- and y-axis, in certain configurations corresponds to the transmission axis. For example, when configured on the AOM 55, the z-axis of the actuator is aligned with the illuminating beam transmission axis.

The illustrated angles, α and β respectively describe rotation about the piezo's x-axis and y-axis. On the basis of these definitions, and assuming small angle displacements only, such that the small angle approximation holds (i.e. sin ∅=∅), the rotation angles and the translational displacement along the piezo's z-axis are given by the following parametric equations:

$$\alpha = \frac{1}{a}\left(A - \frac{1}{2}(B + C)\right) \qquad \text{eq. 1.8}$$

$$\beta = \frac{1}{b}(B - C) \qquad \text{eq. 1.9}$$

$$Z = \frac{1}{3}(A + B + C) \qquad \text{eq. 1.10}$$

A myriad of different dithering patterns may be implemented through selective operation of the individual piezo-actuators A 73, B 75, C 77.

In the following illustrative example, sinusoidal excitation of each actuator A 73, B 75, C 77 is considered for dithering purposes. Accordingly, the individual displacements of each actuator A 73, B 75, C 77 may be expressed as:

$$A = R_a \sin(f_a) \qquad \text{eq. 2.0}$$

$$B = R_b \sin(f_b + \varphi_b) \qquad \text{eq. 2.1}$$

$$C = R_c \sin(f_c + \varphi_c) \qquad \text{eq. 2.2}$$

where $R_a$, $R_b$ and $R_c$ are the amplitudes; $f_a$, $f_b$, and $f_c$ are the operative frequencies of each respective actuator A 73, B 75, C 77; and $\varphi_b$ and $\varphi_c$ represent dephasing with respect to actuator A 73. Equations 2.0 to 2.2 show that up to 8 different parameters may be freely varied for beam dithering purposes.

The number of freely variable parameters may be reduced by introducing constraints. For example, the actuators A 73, B 75, C 77 may be constrained to having the same operative frequency f. On this assumption, the expressions for α, β and Z may be rewritten:

$$\alpha = \frac{1}{a}[Q_\alpha \sin(f + \Delta_\alpha)] \qquad \text{eq. 2.3}$$

$$\beta = \frac{1}{b}[Q_\beta \sin(f + \Delta_\beta)] \qquad \text{eq. 2.4}$$

$$Z = \frac{1}{3}[Q_z \sin(f + \Delta_z)] \qquad \text{eq. 2.5}$$

where the amplitudes $Q_\alpha$, $Q_\beta$, $Q_z$ and the phases $\Delta_\alpha$, $\Delta_\beta$, $\Delta_z$ are derived from combinations of the individual amplitudes and phases of equations 2.0, 2.1 and 2.2. Parameters a and b are constants dependent on the geometry of the actuator module 71, and specifically relate respectively to the vertical distance between actuators A 73 and B 75, and the horizontal distance between actuators B 75 and C 77, as illustrated in FIG. 7. Incidentally, projections of the $\alpha$,$\beta$ parameters on the $\alpha\beta$-plane correspond to the patterns observed on the illuminated surface area of the target.

FIGS. 8a, 8b, 9a and 9b, discussed below, illustrate experimentally verified beam dithering patterns, along with the corresponding projections in the $\alpha\beta$-plane. In the illustrated examples the a and b parameters were set as follows: a=8.7 mm; b=10 mm. The $\alpha$ and $\beta$ parameters being angular quantities, are expressed in milliradians, and Z being a length is expressed in microns.

For illustrative purposes, a further simplification is introduced by assuming that the amplitudes $R_a$, $R_b$ and $R_c$ of the three sinusoidal modulations are equal. The dithering pattern is then defined only by the phases $\varphi_b$ and $\varphi_c$ (see equations 2.0, 2.1 and 2.2). Under these conditions there are two distinct limiting cases, illustrated respectively in FIGS. 8a and 8b. Both figures illustrate three-dimensional plots 81, 83 of the dithering patterns, and associated two-dimensional projections 85, 87 in the $\alpha\beta$-plane corresponding to the two-dimensional dithering patterns observable on the target surface.

Figure 8A:
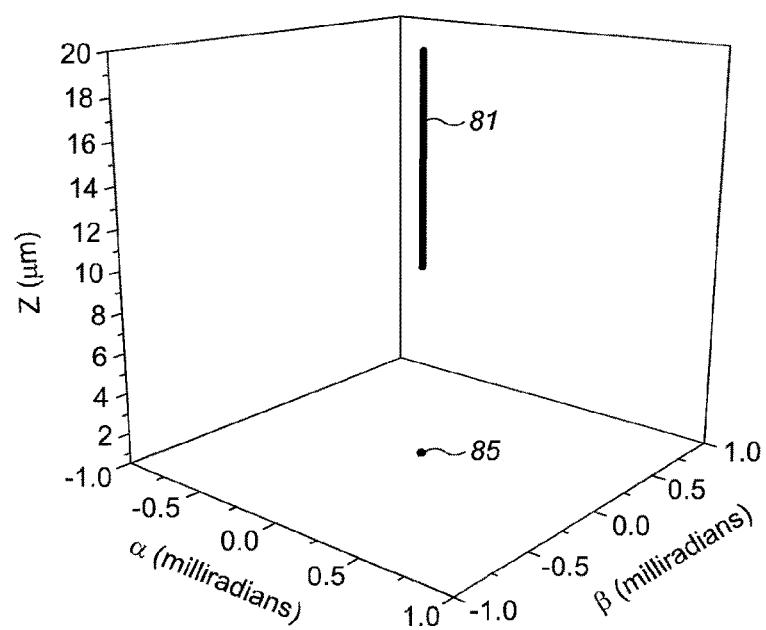
FIGS. 8a and 8b are three dimensional plots and associated projections onto the αβ-plane of dithering patterns obtained when using the piezo-actuator module of FIG. 7, in accordance with the present invention.

FIG. 8a illustrates the limiting condition when $\varphi_b = \varphi_c = 0°$, and $R_a = R_b = R_c = 10$ μm. In this example there is no angular dithering (i.e. no dithering along either x- or y-axis), only translational dithering (i.e. dithering along the transmission axis), which corresponds to pure translational motion of the piezo modulator 71. FIG. 8a is an illustrative beam dithering pattern obtained when implementing the first variant of the present method.

Figure 8B:
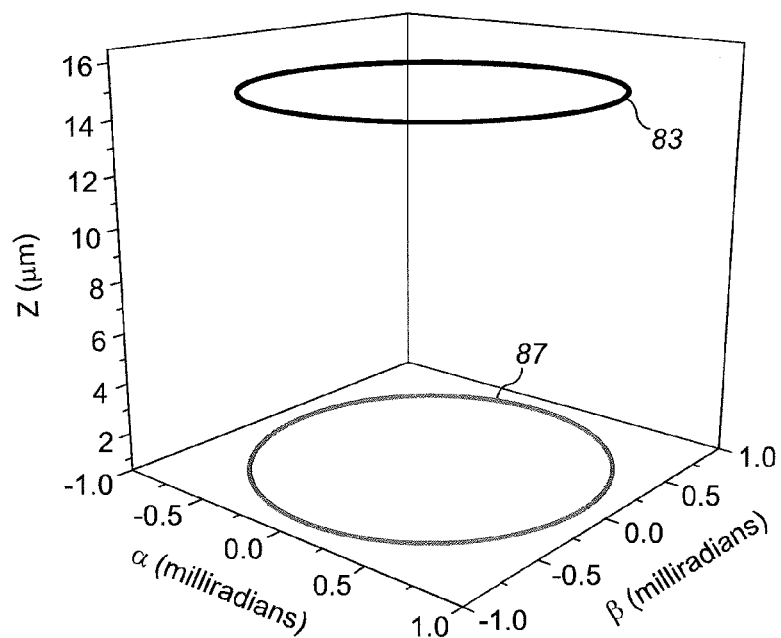

The second limiting case, which corresponds to the second dithering variant, is illustrated in FIG. 8b, where the translation component is held constant (i.e. there is no dithering along the z-axis), and the angular components $\varphi_b = \varphi_c = +/-2.09$ radians (120°). This corresponds to circular dithering patterns 83, 87 and is significantly more effective in producing decorrelated speckle patterns than translational dithering, resulting in more effective speckle reduction.

Alternatively, translational dithering and angular dithering may be combined to provide more complex dithering patterns, in which case unequal operative frequencies having an integer ratio between them (e.g. $f_b = nf_a$ and $f_c = mf_a$, where n and m are integers) may be applied to the actuators A 73, B 75, C 77. The parametric equations 2.0, 2.1 and 2.2 then become those of the Lissajous curves, which are well known (the interested reader is referred to the following website for further details in this regard en.wikipedia.org/wiki/Lissajous_curves). For frequencies that are integer values of each other (i.e. $f_b = nf_a$ and $f_c = mf_a$, where n and m are positive integers) the resulting dithering pattern is a closed loop. Relaxing this condition (e.g. n and m are no longer positive integers but can be non-whole numbers such as 1.5 etc.) substantially retains the overall shape of the dithering pattern, while ensuring a non-closed pattern is produced. It is important to note that the generated patterns are periodic because identical dithering patterns are generated over each dithering cycle. Provided that the dithering cycle period is greater than the sensor integration time, ensures that decorrelated speckle patterns are received by the sensor during a single sensor integration cycle.

Figure 9A:
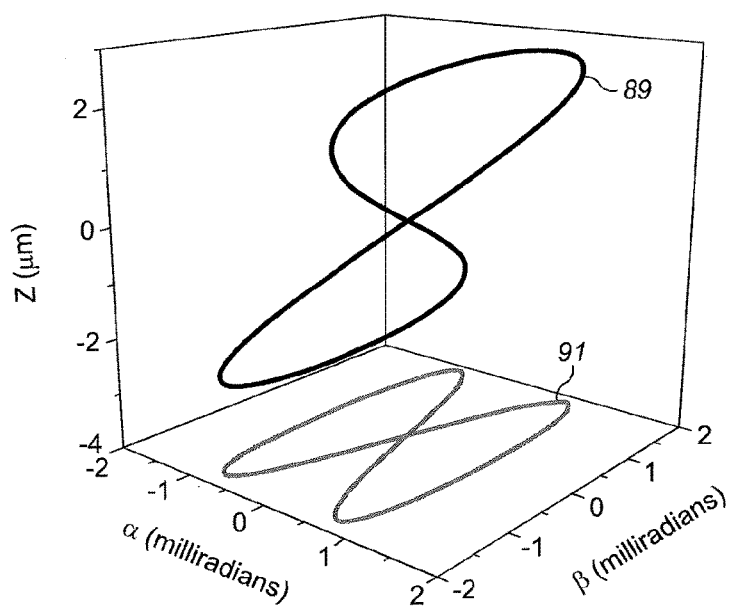
FIGS. 9a and 9b are three dimensional plots and associated projections onto the αβ-plane of Lissajous dithering patterns obtained when using the piezo-actuator module of FIG. 7, in accordance with the present invention.
Figure 9B:
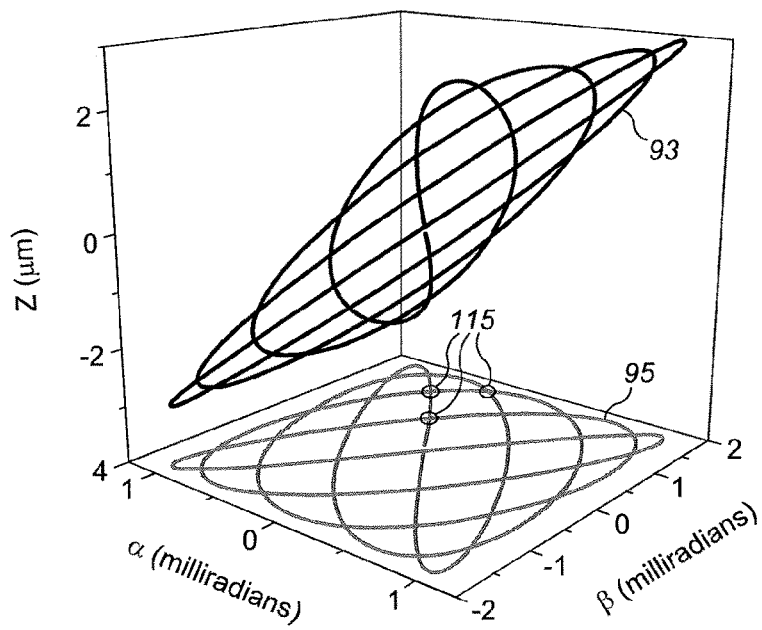

FIGS. 9a and 9b illustrate further examples of dithering patterns, wherein a further constraint is introduced—the modulation applied to actuator C 77 is opposite to that applied to actuator B 75. In this case the parametric equations 1.8, 1.9 and 1.10 simplify to:

$$\alpha = \frac{A}{a} \qquad \text{eq. 2.6}$$

$$\beta = \frac{2B}{b} \qquad \text{eq. 2.7}$$

$$Z = \frac{A}{3} \qquad \text{eq. 2.8}$$

Equations 2.6 and 2.7 show that each of the angular components $\alpha$, $\beta$ may be independently controlled through selective operation of actuators A 73 and B 75. This significantly simplifies the production of well defined dithering patterns. Two examples of Lissajous dithering patterns obtainable using these constraints are outlined below for illustrative purposes only, and are not to be construed as limiting.

FIG. 9a illustrates the Lissajous dithering pattern obtained when the frequency ratio is 1:2 according to the format A:B (i.e. $f_b = 2f_a$), and the modulation parameters are $R_a = R_b = R_c = 9$ μm. The obtained three-dimensional dithering pattern 89 and the associated two-dimensional projection 91 are in the form of a "figure of eight" pattern.

In contrast, FIG. 9b illustrates the Lissajous dithering pattern obtained when the frequency ratio is 4:5 such that $5f_b = 4f_a$ (henceforth referred to as the Lissajous 4:5 dithering pattern). The modulation parameter values were consistent with the preceding example. Modulation with higher frequency ratios leads to more complex dithering patterns, as evidenced by the illustrated three-dimensional dithering pattern 93 and the associated two-dimensional projection 95 in FIG. 9b.

Figure 10A:
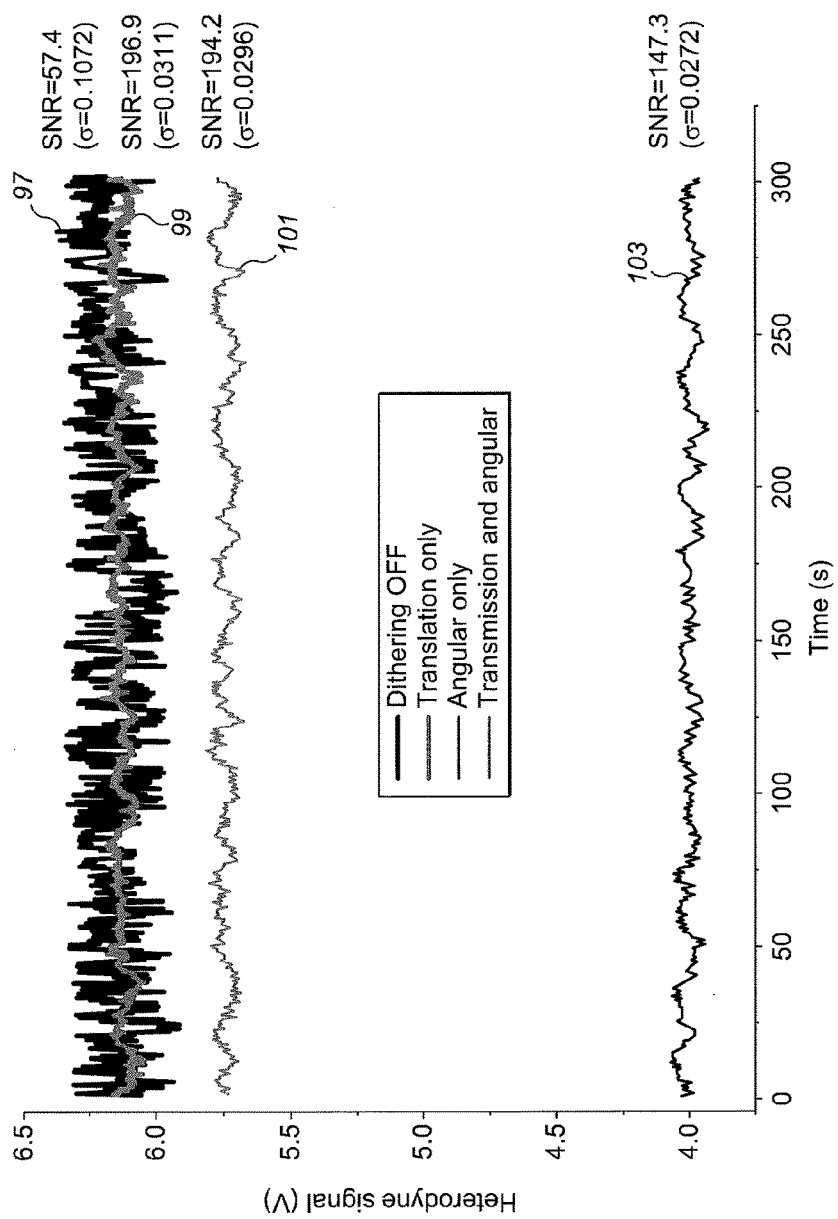
FIGS. 10a and 10b are graphs that show experimental results obtained applying the dithering patterns of FIGS. 8a, 8b, 9a and 9b, in accordance with the present invention.
Figure 10B:
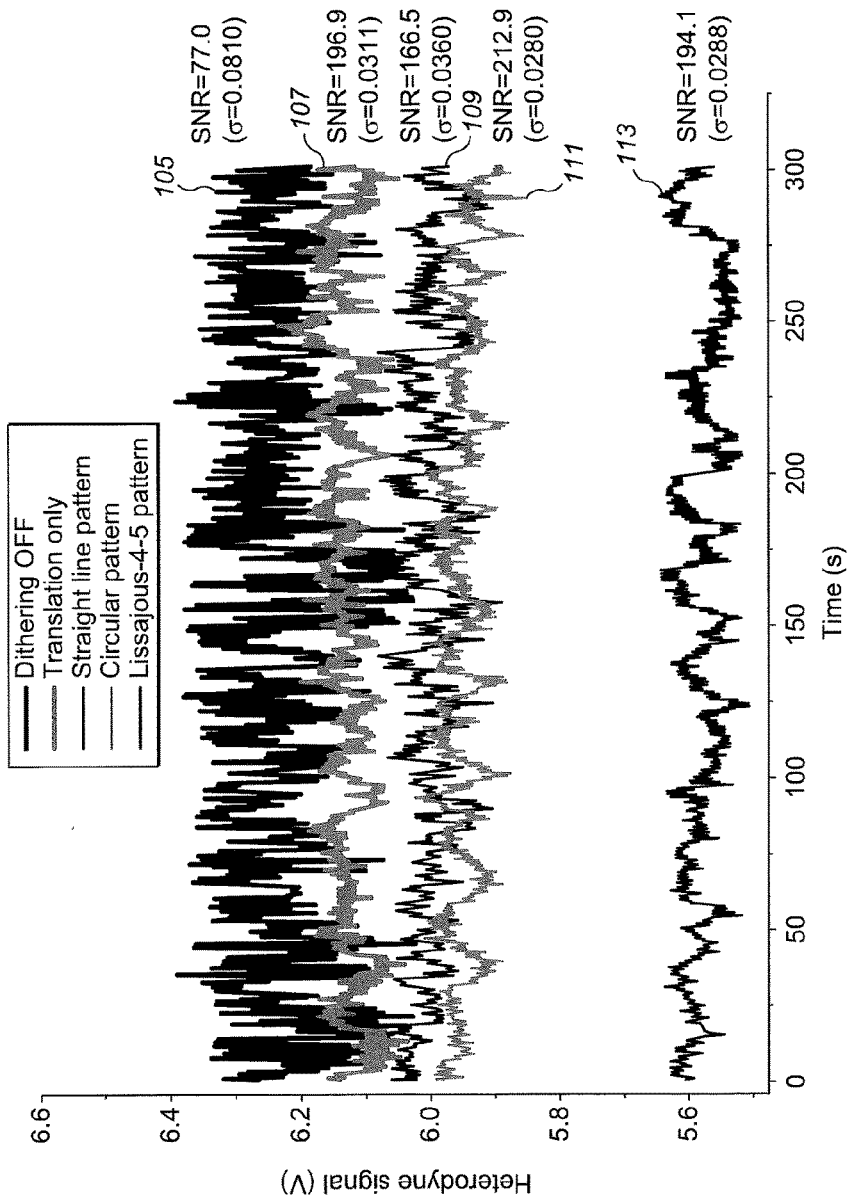

FIGS. 10a and 10b illustrate the temporal traces and associated SNR of heterodyne signals obtained using different types of dithering. In particular, the signals were measured using the system 42 of FIG. 4, having a 100 ms integration time, and configured with the three-axis piezo-actuator module 71 of FIG. 7.

FIG. 10a illustrates the effects of pure translational dithering, pure angular dithering, and the combination of angular and translational dithering on the SNR of measured backscattered heterodyne signals. A measured backscattered heterodyne signal 97 with no active dithering, having an SNR of 57.4 and a standard deviation $\sigma$ of 0.1072 along the intensity axis 98, is provided as a reference signal in FIG. 10a, in order to better illustrate the effects of translational and angular dithering.

The addition of pure translational dithering is illustrated in measured heterodyne signal 99. This corresponds to the dithering pattern 85 of FIG. 8a. This signal 99 was obtained using the three-axis piezo module 71 configured to provide a total translational displacement of 24 µm at 400 Hz. The translationally dithered heterodyne signal 99 does not display any significant intensity decrease when compared to the undithered signal 97. It does however, display a significantly decreased standard deviation of 0.0311, resulting in a signal with a more constant intensity profile. It is also associated with a noticeable improvement in SNR of 196.9 when compared to the undithered signal's SNR of 57.4—almost a four-fold improvement.

When an angular dithering component is added to the translational dithering, heterodyne signal 101 is observed. In the specific example, an elliptical dithering component of radius 3 mm along the horizontal axis and radius 0.5 mm along the vertical component was added to the translational dithering component of signal 97. Whilst the standard deviation remains approximately constant, no noticeable improvements in SNR are observed. However, a slight decrease in signal magnitude is observed. This is likely due to sensor field of view effects, specifically, due to a portion of the backscattered radiation not falling within the field of view of the sensor.

The effect of pure angular dithering, with translational dithering absent, is illustrated in signal 103. Signal 103 was measured when the circular dithering pattern 87 of FIG. 8b was applied, having a diameter of 5.5 mm at 400 Hz. When compared to the reference signal 97, it is clear that speckle reduction is still in effect however, a significant decrease in signal magnitude is also observed. This decrease is due to more substantial sensor field of view effects. In other words, a larger proportion of the backscattered radiation is falling outside the field of view of the sensor.

FIG. 10b illustrates the temporal heterodyne traces obtained when different angular dithering patterns are combined with pure translational dithering. Signal 105 is a reference signal, and relates to the measured heterodyne signal when dithering is absent. In this example, the reference signal 105 is associated with an SNR of 77.0 and a standard deviation of 0.0810.

Heterodyne signal 107 relates to pure translational dithering and coincides with the equivalent translational dithering signal 99 illustrated in FIG. 10a.

Heterodyne signal 109 was measured by combining angular dithering with translational dithering. In this specific example, a linear angular dithering pattern of 4 mm at 400 Hz was combined with the translational dithering of signal 107. The measured signal 109 is associated with an SNR of 166.5. The three-axis piezo module 71 was configured to enable rotation about a single axis in order to trace a straight line on the surface of the target. Compared to the reference signal 105, the heterodyne signal 109 displays an improved standard deviation of 0.0360, and an improved SNR. A slight drop in signal magnitude is observed, and is accounted for by sensor field of view effects. In particular, due to portions of backscattered radiation falling outside the field of view of the sensor. When compared to the signal 107 obtained using pure translational dithering, a slight decrease in SNR is observed, whilst the standard deviation remains substantially unaffected.

Heterodyne signal 111 was measured by combining the circular beam dithering 83 of FIG. 8b having a diameter of 4 mm at 400 Hz, with the translational dithering of signal 107. Note that this is equivalent to combining the beam dithering patterns of FIGS. 8a and 8b. Combining circular dithering with translational dithering has a noticeable effect on SNR, increasing it to 212.9, whilst having little effect on the standard deviation when compared to the translational dithering signal 107. A noticeable drop-off in signal magnitude is also observed, which is due to sensor field of view effects.

Heterodyne signal 113 was measured using the Lissajous 4:5 dithering pattern of FIG. 9b. Whilst little variation in standard deviation is observed, a decrease in both SNR and signal magnitude are observed when compared to the translational dithering signal 107. The decrease in SNR is due to the same surface area points being illuminated during the sensor integration time, reducing the number of generated uncorrelated speckle patterns. This is best illustrated with reference to the Lissajous 4:5 dithering pattern 95 of FIG. 9b, where each node 115 represents a target area which has been illuminated more than once during the sensor integration time. Accordingly, it is expected that such a dithering pattern will not be as effective in producing decorrelated speckle patterns as a dithering pattern which does not result in any repeated illumination of identical target surface areas during the sensor integration time, such as the circular dithering pattern 87 of FIG. 8b, and as confirmed by heterodyne signal 111 of FIG. 10b.

The experimental results illustrated in FIGS. 9a, 9b, 10a and 10b confirm the advantages associated with using non-repetitive dithering patterns within the sensor integration time for generating decorrelated speckle patterns in order to reduce speckle noise in an active optical heterodyne detection system.

Further Embodiments

It is to be appreciated that there are different ways of implementing the second dithering variant, in order to capture decorrelated speckle patterns at the sensor.

With reference to FIG. 1b, both the first and second illuminating beams 1, 9 may be emitted from different illuminating sources. For example, two identical coherent light sources could be used, and activated in order to illuminate different target areas within the integration time of the sensor. However, in the majority of practical applications requiring a high degree of coherency in the emitted radiation, use of a single light source may be preferable, to ensure that the emitted beams are coherent. In such embodiments, the illuminating beam is preferably displaced with respect to the target by the required amount.

Alternatively, rather than displacing the illuminating beam with respect to the target, the target may be displaced with respect to the illuminating beam. In order to ensure that decorellated speckle patterns are measured at the sensor, the target is displaced with a linear speed given by equation 1.1.

Similarly, the target may be rotated with respect to a fixed illuminating beam, with an angular velocity ω greater than the ratio of the angular displacement θ over the sensor integration time τ.

$$\omega > \frac{\theta}{\tau} \qquad \text{eq. 2.9}$$

This condition ensures that as the target rotates the illuminating beam illuminates at least two different target areas separated by a distance greater than the speckle coherence length $L_c$, ensuring that decorrelated speckle patterns are received at the sensor. Accordingly, in the present context displacement of the illuminating beam is to be understood as relative displacement of the illuminating beam relative to the target.

In the majority of real-world applications, it is not feasible or practical to move the target. In such applications, it is necessary to displace the illuminating beam with respect to the target using optical apparatus and methods, as described previously.

The skilled reader will appreciate that the herein described embodiments are exemplary, and further alternatives not explicitly discussed herein may be used without departing from the scope of the present invention as claimed.

The invention claimed is:

1. A method of reducing speckle noise in a system comprising a sensor for detecting electro-magnetic radiation backscattered from a target, and an illumination source, the method comprising:
   illuminating the target with a first illuminating beam having a first optical path;
   illuminating the target with a second illuminating beam having a second optical path different to the first optical path, the illuminating being carried out using transmitting optics and the illumination source, the transmitting optics being arranged to guide the illumination beams to the target;
   varying the optical path of the first illuminating beam relative to the target to define the second illuminating beam to introduce a set phase difference between the first and second illuminating beams, such that the first illuminating beam and the second illuminating beam interfere deconstructively;
   capturing at the sensor, using receiving optics that are separate from the transmitting optics, first and second backscattered radiation components associated with respectively the first and second illuminating beams, each of the backscattered radiation components comprising a speckle pattern and wherein the set phase difference is maintained in the backscattered radiation components, the receiving optics being arranged to guide the backscattered radiation components to the sensor; and
   taking, at the sensor, a time-averaged measurement of the intensities of the first and second backscattered radiation components;
   wherein the capturing step is carried out within an integration time $\tau$ of the sensor, such that the time-averaged intensity measurement results in a decrease in speckle noise present in a signal representing the backscattered radiation.

2. The method of claim 1, wherein the system comprises a single coherent electro-magnetic radiation source and the first and second illuminating beams are emitted by the source.

3. The method of claim 1, wherein the set phase difference is $n\pi$, where n is any positive odd integer.

4. The method of claim 2, wherein the illuminating beams propagate along a transmission axis, and the varying step comprises varying the optical path length in a direction substantially parallel to the transmission axis.

5. The method of claim 1, wherein the first and second illuminating beams illuminate the same target area.

6. The method of claim 1, wherein the target is illuminated at a first position with the first illuminating beam, and at a second target position with the second illuminating beam, and the varying step comprises displacing the first illuminating beam relative to the target between the first and second target positions.

7. The method of claim 6, wherein the first and second target positions are separated by a distance greater than a speckle coherence length $L_c$, such that the speckle patterns produced at respectively the first and second target positions are decorrelated.

8. The method of claim 6, wherein in the varying step the illuminating beam is displaced by an angle of rotation $\theta$ relative to the target in order to illuminate the second target position.

9. The method of claim 8, wherein the angle of rotation $\theta$ is defined by the inequality:

$$\theta > \frac{L_c}{R} \cong \frac{\lambda}{d}$$

where $L_c$ is the speckle coherence length; R is the linear distance of the target from the illumination source; $\lambda$ is the wavelength of the illuminating beam; and d is the diameter of the illuminating beam at the target.

10. The method of claim 6, wherein the illuminating beam is displaced relative to the target from the first target position to the second target position with a velocity s defined by the inequality:

$$s > \frac{L_c}{\tau}$$

where $L_c$ is the speckle coherence length, and $\tau$ is the sensor integration time.

11. The method of claim 6, wherein the illuminating beam is displaced relative to the target from illuminating the first target position to illuminating the second target position with an angular velocity $\omega$ defined by the inequality:

$$\omega > \frac{\theta}{\tau}$$

where $\theta$ is the angle of rotation, and $\tau$ is the sensor integration time.

12. The method of claim 6, wherein intervening target positions are illuminated when displacing the illuminating beam relative to the target from illuminating the first target position to illuminating the second target position.

13. The method of claim 12, wherein the illuminating beam illuminates a selection of target positions in a repeating pattern having a repetition period larger than the sensor integration time $\tau$, to ensure that different target positions are illuminated within the sensor integration time $\tau$.

14. The method of claim 12, wherein the illuminating beam illuminates a random selection of intervening target positions within the sensor integration time $\tau$.

15. The method of claim 12, wherein the illuminating beam illuminates a selection of target positions lying in a substantially circular pattern within the sensor integration time $\tau$.

16. Apparatus for sensing electro-magnetic radiation backscattered from a target, the apparatus comprising:
   an illumination source arranged to produce a first illuminating beam having a first optical path and a second illuminating beam having a second optical path different to the first optical path;
   a beam dithering system arranged to define the first and second illuminating beams by varying the optical path of an illuminating beam and to displace the first illuminating beam relative to the target in order to introduce a set phase difference between the first and second illuminating beams, such that the first illuminating beam and the second illuminating beam interfere deconstructively;

transmitting optics arranged, in use, to direct the first illuminating beam and the second illuminating beam to the target;

receiving optics arranged to direct, in use, a first backscattered radiation component backscattered from the target when illuminated with the first illuminating beam and a second backscattered radiation component backscattered from the target when illuminated with the second illuminating beam, to a sensor, the set phase difference being maintained in the backscattered radiation components;

the sensor being arranged to capture, in use, within a sensor integration time τ, the first backscattered radiation component and the second backscattered radiation component backscattered from the target, and to take a time-averaged measurement of the intensity of the captured first and second backscattered radiation components, each of which comprises a speckle pattern, such that the time-averaged measurement results in a decrease in speckle noise present in a signal representing the backscattered radiation; and wherein the receiving optics is separate from the transmitting optics.

17. The apparatus of claim 16, wherein the beam dithering system is arranged to displace the first illuminating beam relative to the target in order to introduce a set phase difference of nπ, where n is any positive odd integer, between the first and second illuminating beams.

18. The apparatus of claim 16, wherein the first illuminating beam propagates along a transmission axis, and the beam dithering system is arranged to displace the first illuminating beam in a direction substantially parallel to the transmission axis.

19. The apparatus of claim 16, wherein the first illuminating beam is directed to illuminate a first target position, the second illuminating beam is directed to illuminate a second target position, and the beam dithering system is arranged to displace the first illuminating beam relative to the target by a distance greater than a speckle coherence length $L_c$ to define the second optical path of the second illuminating beam, such that the first and second backscattered electro-magnetic radiation components comprise decorrelated speckle patterns.

20. The apparatus of claim 16, wherein the beam dithering system is arranged to displace the first illuminating beam by an angle of rotation θ relative to the target in order to illuminate the second target position.

21. The apparatus of claim 16, wherein the angle of rotation θ is defined by the inequality:

$$\theta > \frac{L_c}{R} \cong \frac{\lambda}{d}$$

where $L_c$ is the speckle coherence length; R is the linear distance of the target from the illumination source; λ is the wavelength of the first illuminating beam; and d is the diameter of the first illuminating beam at the target.

22. The apparatus of claim 19, wherein the beam dithering system is arranged to displace the first illuminating beam relative to the target from illuminating the first target position to the illuminating the second target position with a velocity s defined by the inequality:

$$s > \frac{L_c}{\tau}$$

where $L_c$ is the speckle coherence length, and τ is the sensor integration time.

23. The apparatus of claim 19, wherein the beam dithering system is arranged to displace the first illuminating beam relative to the target from illuminating the first target position to illuminating the second target position with an angular velocity ω defined by the inequality:

$$\omega > \frac{\theta}{\tau}$$

where θ is the angle of rotation, and τ is the sensor integration time.

24. The apparatus of claim 19, wherein the beam dithering system is arranged to illuminate intervening target positions when displacing the illuminating beam from illuminating the first target position to illuminating the second target position.

25. The apparatus of claim 24, wherein the beam dithering system is arranged to displace the first illuminating beam relative to the target in accordance with a predetermined pattern such that the first, second and intervening target positions are illuminated in accordance with the predetermined pattern.

26. The apparatus of claim 25, wherein the beam dithering system is arranged to displace the first illuminating beam relative to the target such that the target positions are illuminated in accordance with a predetermined repeating pattern having a repetition period greater than the sensor integration time τ, to ensure that different target positions are illuminated within the sensor integration time τ.

27. The apparatus of claim 24, wherein the optical path varying means is arranged to displace the first illuminating beam relative to the target such that the target positions are illuminated in a substantially circular pattern within the sensor integration time τ.

28. The apparatus of claim 25, wherein the beam dithering system is arranged to displace the first illuminating beam relative to the target such that the target positions are illuminated in accordance with a random pattern within the sensor integration time τ.

29. The apparatus of claim 16, wherein the beam dithering system comprises an actuator operatively coupled to a mirror arranged to reflect an illuminating beam, and the actuator is arranged to displace the relative position and/or orientation of the mirror with respect to the target in order to vary the optical path of the illuminating beam reflected from the mirror.

30. The apparatus of claim 17, wherein the beam dithering system comprises an actuator operatively coupled to a mirror arranged to reflect an illuminating beam, and the actuator is configured in use to displace the position of the mirror with respect to the target in a direction substantially parallel to the transmission axis, in order to vary the optical path of the illuminating beam reflected from the mirror.

31. The apparatus of claim 18, wherein the beam dithering system comprises an actuator operatively coupled to a mirror arranged to reflect an illuminating beam, and the actuator is arranged to vary the orientation of the mirror with respect to the target in order to displace the first illuminating beam with respect to the target.

32. The apparatus of claim 29, wherein the actuator comprises at least one piezo-actuator coupled to the mirror, which piezo-actuator is arranged to deform in use upon the application of a voltage to displace the relative position and/or orientation of the mirror with respect to the target.

* * * * *